US012586593B2

(12) United States Patent
Eichenseer et al.

(10) Patent No.: US 12,586,593 B2
(45) **Date of Patent: *Mar. 24, 2026**

(54) APPARATUS AND METHOD FOR ENCODING A PLURALITY OF AUDIO OBJECTS OR APPARATUS AND METHOD FOR DECODING USING TWO OR MORE RELEVANT AUDIO OBJECTS

(71) Applicant: Fraunhofer-Gesellschaft zur Förderung der angewandten Forschung e.V., Munich (DE)

(72) Inventors: Andrea Eichenseer, Erlangen (DE); Srikanth Korse, Erlangen (DE); Stefan Bayer, Erlangen (DE); Fabian Küch, Erlangen (DE); Oliver Thiergart, Erlangen (DE); Guillaume Fuchs, Erlangen (DE); Dominik Weckbecker, Erlangen (DE); Jürgen Herre, Erlangen (DE); Markus Multrus, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 313 days.

This patent is subject to a terminal disclaimer.

(21) Appl. No.: 18/296,523

(22) Filed: Apr. 6, 2023

(65) Prior Publication Data

US 2023/0298602 A1 Sep. 21, 2023

Related U.S. Application Data

(63) Continuation of application No. PCT/EP2021/078217, filed on Oct. 12, 2021.

(30) Foreign Application Priority Data

Oct. 13, 2020 (EP) .................................... 20201633
Dec. 18, 2020 (EP) .................................... 20215651
Jul. 7, 2021 (EP) .................................... 21184367

(51) Int. Cl.
*G10L 19/02* (2013.01)
*G10L 19/008* (2013.01)
*G10L 25/03* (2013.01)

(52) U.S. Cl.
CPC ............ *G10L 19/02* (2013.01); *G10L 19/008* (2013.01)

(58) Field of Classification Search
CPC ...... H04S 7/302; H04S 3/008; H04S 2400/01; H04S 2400/11; H04S 2420/03; G10L 19/02; G10L 19/008; G10L 25/03
(Continued)

(56) References Cited

U.S. PATENT DOCUMENTS 7,720,230 B2 5/2010 Allamanche et al.
10,249,311 B2 4/2019 Adami et al.
(Continued)

FOREIGN PATENT DOCUMENTS

CN 101506875 A 8/2009
CN 101199121 B 3/2012
(Continued)

OTHER PUBLICATIONS

International Search Report and Written Opinion issued in application No. PCT/EP2021/078217.
(Continued)

*Primary Examiner* — George C Monikang
(74) *Attorney, Agent, or Firm* — McClure, Qualey & Rodack, LLP

(57) ABSTRACT

Apparatus for encoding a plurality of audio objects, having: an object parameter calculator configured for calculating, for one or more frequency bins of a plurality of frequency bins related to a time frame, parameter data for at least two
(Continued)

relevant audio objects, wherein a number of the at least two relevant audio objects is lower than a total number of the plurality of audio objects, and an output interface for outputting an encoded audio signal having information on the parameter data for the at least two relevant audio objects for the one or more frequency bins.

28 Claims, 19 Drawing Sheets

(58) Field of Classification Search
USPC .......................................... 381/17–19, 22, 23
See application file for complete search history.

(56) References Cited

U.S. PATENT DOCUMENTS

| | | | |
|---|---|---|---|
| 2009/0326958 A1 | 12/2009 | Kim | |
| 2010/0169103 A1 | 7/2010 | Pulkki | |
| 2011/0029113 A1 | 2/2011 | Ishikawa et al. | |
| 2012/0114126 A1* | 5/2012 | Thiergart | G10L 21/0272 381/17 |
| 2013/0013323 A1 | 1/2013 | Subbaraman et al. | |
| 2015/0049872 A1 | 2/2015 | Virette et al. | |
| 2015/0081312 A1 | 3/2015 | Subbaraman et al. | |
| 2016/0064006 A1 | 3/2016 | Disch et al. | |
| 2016/0104496 A1 | 4/2016 | Purnhagen | |
| 2016/0125887 A1 | 5/2016 | Purnhagen | |
| 2016/0142846 A1 | 5/2016 | Herre | |
| 2016/0142853 A1 | 5/2016 | Herre et al. | |
| 2016/0189718 A1 | 6/2016 | Davis | |
| 2017/0251321 A1 | 8/2017 | Samuelsson et al. | |
| 2020/0221230 A1 | 7/2020 | Fuchs | |

FOREIGN PATENT DOCUMENTS

| | | | |
|---|---|---|---|
| CN | 102176311 | B | 9/2014 |
| CN | 104769671 | A | 7/2015 |
| CN | 105229731 | A | 1/2016 |
| EP | 2830050 | A1 | 1/2015 |
| EP | 2702776 | B1 | 9/2015 |
| JP | 2012198556 | A | 10/2012 |
| JP | 2017199034 | A | 11/2017 |
| JP | 6268180 | B2 | 1/2018 |
| JP | 2020110007 | A | 7/2020 |
| RU | 2 339 088 | C1 | 11/2008 |
| RU | 2 641 481 | C2 | 1/2018 |
| TW | 201207846 | A | 2/2012 |
| TW | 201503112 | A | 1/2015 |
| TW | 201923744 | A | 6/2019 |
| TW | 202016925 | A | 5/2020 |
| TW | 202032538 | A | 9/2020 |
| WO | 2005/086139 | A1 | 9/2005 |
| WO | 2007/074401 | A2 | 7/2007 |
| WO | 2007/111568 | A2 | 10/2007 |
| WO | 2008/131903 | A1 | 11/2008 |
| WO | 2011/110591 | A1 | 9/2011 |
| WO | 2014/053548 | A1 | 4/2014 |
| WO | 2015/011024 | A1 | 1/2015 |
| WO | 2019/067620 | A1 | 4/2019 |
| WO | 2019/068638 | A1 | 4/2019 |
| WO | 2019097017 | A1 | 5/2019 |
| WO | 2020084170 | A1 | 4/2020 |
| WO | 2020/152154 | A1 | 7/2020 |
| WO | 2020/249815 | A2 | 12/2020 |

OTHER PUBLICATIONS

Pulkki, V., et al.l; "Directional audio coding perception-based reproduction of spatial sound;" International Workshop on the Principles and Application on Spatial Hearing; Nov. 2009; pp. 1-4.
Herre, J., et al.; "MPEG spatial audio object coding—the ISO/MPEG standard for efficient coding of interactive audio scenes;" J. AES; vol. 60; No. 9; Sep. 2012; pp. 655-673.
Herre, J., et al.; "MPEG-H Audio—The new standard for universal spatial/3D audio coding;" Proc. 137th AES Conv; 2014; pp. 1-12.
Herre, J., et al.l; "MPEG-H 3D Audio—The New Standard for Coding of Immersive Spatial Audio;" IEEE Journal of Selected Topics in Signal Processing; vol. 9; No. 5; Aug. 2015; pp. 770-779.
"Information technology—High efficiency coding and media delivery in heterogeneous environments—Part 3: 3D audio;" Text of ISO/MPEG 23008-3/DIS 3D Audio, Sapporo, ISO/IEC JTC1/SC29/WG11 N14747; Jul. 2014; pp. 1-441.
Pulkki, V.; "Virtual sound source positioning using vector base amplitude panning;" J. Audio Eng. Soc.; vol. 45; No. 6; Jun. 1997; pp. 456-466.
Barber, C.B., et al.; "The quickhull algorithm for convex hulls;" Proc. ACM Trans. Math. Software (TOMS); vol. 22; Dec. 1996; pp. 469-483.
Hirvonen, T., et al.; "Perceptual compression methods for metadata in Directional Audio Coding applied to audiovisual teleconference;" AES 126th Convention 2009; May 2009; pp. 1-8.
Borß, C.; "A Polygon-Based Panning Method for 3D Loudspeaker Setups;" AES 137th Convention 2014; Oct. 2014; pp. 1-10.
Faller, C., et al.; "Efficient representation of spatial audio using perceptual parametrization;" Proceedings of the 2001 IEEE Workshop on the Applications of Signal Processing to Audio and Acoustics; Oct. 2001; pp. 199-202.
Purnhagen, H., et al.; "Immersive Audio Delivery Using Joint Object Coding;" 140th AES Convention, Paper No. 9587; May 2016; pp. 1-9.
Norling, K., et al.; "AC-4—The Next Generation Audio Codec;" 140th AES Convention, Paper No. 9491; May 2016; pp. 1-10.
Vilkamo, J., et al.; "Optimized covariance domain framework for time-frequency processing of spatial audio;" Journal of the Audio Engineering Society; vol. 61; No. 6; Jun. 2013; pp. 403-411.
Golub, G.H, et al.; "Matrix Computations;" Johns Hopkins University Press, 4th edition; 2013; pp. 1-780.
Japanese language office action dated Jul. 29, 2024, issued in application No. JP 2023-522513.
English language translation of office action issued in JP 2023-522513 (pp. 1-9 of attachment).
Japanese language office action dated Jul. 29, 2024, issued in application No. JP 2023-522519.
English language translation of office action issued in JP 2023-522519 (pp. 1-7 of attachment).
Office Action dated Jan. 17, 2025, issued in application No. IN 202337027043.
Russian language office action dated Oct. 17, 2023, issued in application No. RU 2023112160.
English language translation of office action dated Oct. 17, 2023 (pp. 1-5 of attachment).
Extended European Search Report dated Nov. 20, 2024, issued in application No. EP 24203322.3.
"MPEG audio technologies Part 2: Spatial Audio Object Coding (SAOC);" ISO/IEC JTC1/SC29/WG11 (MPEG) International Standard 23003-2; 2017; pp. 1-181.
Russian language office action dated Aug. 1, 2023, issued in application No. RU 2023112171.
English language translation of office action dated Aug. 1, 2023 (pp. 1-6 of attachment).
Japanese language office action dated Oct. 7, 2025, issued in application No. JP 2023-522519 (English language translation, pp. 1-4 of attachment).
Indian language office action dated Nov. 13, 2025, issued in application No. IN 202337027043 (English language translation included).
Engdegard, J., et al.; "Spatial Audio Object Coding (SAOC)—The Upcoming MPEG Standard on Parametric Object Based Audio Coding;" Journal of The Audio Engineering Society; 2008; pp. 1-15 https://api.semanticscholar.org/CorpusID:13834171.
Chinese language office action dated Nov. 30, 2025, issued in application No. CN 202180077244.8 (English language translation, pp. 11-22 of attachment).

* cited by examiner (HIGH RESOLUTION FILTERBANK TIME/FREQUENCY FILES)

(PARAMETER DATA FOR EACH FRAME )

816 / 818

| object ID | direction information |
|---|---|
| 1 | Azi. / elev. |
| 2 | Azi. / elev. |
| 3 | Azi. / elev. |
| 4 | |
| 5 | |
| ⋮ | ⋮ |
| N-1 | |
| N | |

APPARATUS AND METHOD FOR ENCODING A PLURALITY OF AUDIO OBJECTS OR APPARATUS AND METHOD FOR DECODING USING TWO OR MORE RELEVANT AUDIO OBJECTS

CROSS-REFERENCE TO RELATED APPLICATIONS

This application is a continuation of copending International Application No. PCT/EP2021/078217, filed Oct. 12, 2021, which is incorporated herein by reference in its entirety, and additionally claims priority from European Application No. 20201633.3, filed Oct. 13, 2020, from European Application No. 20215651.9, filed Dec. 18, 2020, and from European Application No. 21184367.7, filed Jul. 7, 2021, all of which are incorporated herein by reference in their entirety.

TECHNICAL FIELD

The present invention relates to encoding of audio signals, for example, audio objects and decoding of encoded audio signals such as encoded audio objects.

This document describes a parametric approach for encoding and decoding object-based audio content at low bitrates using Directional Audio Coding (DirAC). The presented embodiment operates as part of the 3GPP Immersive Voice and Audio Services (IVAS) codec and therein provides an advantageous replacement for low bitrates of the Independent Stream with Metadata (ISM) mode, a discrete coding approach.

BACKGROUND OF THE INVENTION

Discrete Coding of Objects

The most straightforward approach to code object-based audio content is to individually code and transmit the objects along with the corresponding metadata. The major drawback with this approach is the prohibitive bit consumption needed to encode the objects as the number of objects increases. A simple solution to this problem is to employ "parametric approaches", where some relevant parameters are computed from the input signal, quantized and transmitted along with a suitable downmix signal that combines several object waveforms.

Spatial Audio Object Coding (SAOC)

Spatial Audio Object Coding [SAOC_STD, SAOC_AES] is a parametric approach where the encoder computes a downmix signal based on some downmix matrix D and a set of parameters and transmits both to the decoder. The parameters represent psychoacoustically relevant properties and relations of all individual objects. At the decoder, the downmix is rendered to a specific loudspeaker layout using the rendering matrix R.

The main parameter of SAOC is the object covariance matrix E of size N-by-N, where N refers to the number of objects. This parameter is transported to the decoder as object level differences (OLD) and optional inter-object covariance (IOC).

The individual elements $e_{i,j}$ of matrix E are given by:

$$e_{i,j}=\sqrt{OLD_i OLD_j} IOC_{i,j}$$

The object level difference (OLD) is defined as $$OLD_i^{l,m}=\frac{nrg_{i,i}^{l,m}}{NRG^{l,m}},$$

where $$nrg_{i,i}^{l,m}$$

and the absolute object energy (NRG) are described as $$nrg_{i,i}^{l,m}=\frac{\sum_{n\in l}\sum_{k\in m}x_i^{n,k}\left(x_i^{n,k}\right)^*}{\sum_{n\in l}\sum_{k\in m}1}+\varepsilon$$

and $$NRG^{l,m}=\max_i\left(nrg_{i,i}^{l,m}\right),$$

where i and j are the object indices for the objects $x_i$ and $x_j$, respectively, n indicates the time index, and k indicates the frequency index. l indicates a set of time indices and m indicates a set of frequency indices. ε is an additive constant to avoid division by zero, e.g., ε=10.

A similarity measure of the input objects (IOC) may, e.g., be given by the cross correlation:

$$IOC_{i,j}^{l,m}=\mathrm{Re}\left\{\frac{nrg_{i,j}^{l,m}}{\sqrt{nrg_{i,i}^{l,m}\,nrg_{j,j}^{l,m}}}\right\}$$

The downmix matrix D of size N_dmx-by-N is defined by the elements $d_{i,j}$ where i refers to the channel index of the downmix signal and j refers to the object index. For a stereo downmix (N_dmx=2), $d_{i,j}$ is computed from the parameters DMG and DCLD as $$d_{0,j}=10^{0.05DMG_j}\sqrt{\frac{10^{0.1DCLD_j}}{1+10^{0.1DCLD_j}}},\; d_{1,j}=10^{0.05DMG_j}\sqrt{\frac{1}{1+10^{0.1DCLD_j}}},$$

where $DMG_i$ and $DCLD_i$ are given by:

$$DMG_i=10\log_{10}\left(d_{1,i}^2+d_{2,i}^2+\varepsilon\right)$$

$$DCLD_i=10\log_{10}\left(\frac{d_{1,i}^2+\varepsilon}{d_{2,i}^2+\varepsilon}\right)$$

For the mono downmix (N_dmx=1) case, $d_{i,j}$ is computed from just the DMG parameters as $$d_{0,j}=10^{0.05DMG_j}$$

where $$DMG_i=10\log_{10}\left(d_{1,i}^2+\varepsilon\right)$$

Spatial Audio Object Coding-3D (SAOC-3D)

Spatial Audio Object Coding 3D Audio reproduction (SAOC-3D) [MPEGH_AES, MPEGH_IEEE, MPEGH_STD, SAOC_3D_PAT] is an extension of the MPEG SAOC technology described above which compresses and renders both channel and object signals in a very bitrate-efficient way.

The major differences to SAOC are:

- While the original SAOC only supports up to two downmix channels, SAOC-3D can map the multi-object input to an arbitrary number of downmix channels (and associated side information).
- Rendering to multi-channel output is done directly in contrast to classic SAOC which has been using MPEG Surround as a multi-channel output processor.
- Some tools, such as the residual coding tool, were dropped.

In spite of these differences, SAOC-3D is identical to SAOC from a parameter perspective. The SAOC-3D decoder—similar to the SAOC decoder—receives the multi-channel downmix X, the covariance matrix E, the rendering matrix R and the downmix matrix D.

The rendering matrix R is defined by the input channels and the input objects and received from the format converter (channels) and the object renderer (objects), respectively.

The downmix matrix D is defined by the elements $d_{i,j}$, where i refers to the channel index of the downmix signal and j refers to the object index and is computed from the downmix gains (DMG):

$$d_{i,j}=10^{0.05DMG_{i,j}},$$

where $$DMG_{i,j}=10\log_{10}\left(d_{i,j}^2+\varepsilon\right).$$

The output covariance matrix C of size N_out*N_out is defined as:

$$C=RER^*$$

Related Schemes

Several other schemes exist that are similar in nature to SAOC as described above with minor differences:

- Binaural Cue Coding (BCC) for Objects has been described in, e.g., [BCC2001] and is a predecessor of the SAOC technology.
- Joint Object Coding (JOC) und Advanced Joint Object Coding (A-JOC) perform a similar function as SAOC while delivering roughly separated objects on the decoder side without rendering them to a specific output speaker layout [JOC_AES, AC4_AES]. This technology transmits the elements of the upmix matrix from downmix to separated objects as parameters (rather than OLDs).

Directional Audio Coding (DirAC)

Another parametric approach is Directional Audio Coding. DirAC [Pulkki2009] is a perceptually motivated reproduction of spatial sound. It is assumed that at one time instant and for one critical band, the spatial resolution of the human auditory system is limited to decoding one cue for direction and another for inter-aural coherence.

Based on these assumptions, DirAC represents the spatial sound in one frequency band by cross-fading two streams: a non-directional diffuse stream and a directional non-diffuse stream. The DirAC processing is performed in two phases: the analysis and the synthesis as pictured in FIGS. 12*a* and 12*b*.

In the DirAC analysis stage, a first-order coincident microphone in B-format is considered as input and the diffuseness and direction of arrival of the sound is analyzed in frequency domain.

In the DirAC synthesis stage, sound is divided into two streams, the non-diffuse stream and the diffuse stream. The non-diffuse stream is reproduced as point sources using amplitude panning, which can be done by using vector base amplitude panning (VBAP) [Pulkki1997]. The diffuse stream is responsible for the sensation of envelopment and is produced by conveying to the loudspeakers mutually decorrelated signals.

The analysis stage in FIG. 12*a* comprises a band filter 1000, an energy estimator 1001, an intensity estimator 1002, temporal averaging elements 999*a* and 999*b*, a diffuseness calculator 1003 and a direction calculator 1004. The calculated spatial parameters are a diffuseness value between 0 and 1 for each time/frequency tile and a direction of arrival parameter for each time/frequency tile generated by block 1004. In FIG. 12*a*, the direction parameter comprises an azimuth angle and an elevation angle indicating the direction of arrival of a sound with respect to the reference or listening position and, particularly, with respect to the position, where the microphone is located, from which the four component signals input into the band filter 1000 are collected. These component signals are, in the FIG. 12*a* illustration, first-order Ambisonics components which comprise an omnidirectional component W, a directional component X, another directional component Y and a further directional component Z.

The DirAC synthesis stage illustrated in FIG. 12*b* comprises a band filter 1005 for generating a time/frequency representation of the B-format microphone signals W, X, Y, Z. The corresponding signals for the individual time/frequency tiles are input into a virtual microphone stage 1006 that generates, for each channel, a virtual microphone signal. Particularly, for generating the virtual microphone signal, for example, for the center channel, a virtual microphone is directed in the direction of the center channel and the resulting signal is the corresponding component signal for the center channel. The signal is then processed via a direct signal branch 1015 and a diffuse signal branch 1014. Both branches comprise corresponding gain adjusters or amplifiers that are controlled by diffuseness values derived from the original diffuseness parameter in blocks 1007, 1008 and furthermore processed in blocks 1009, 1010 in order to obtain a certain microphone compensation.

The component signal in the direct signal branch 1015 is also gain-adjusted using a gain parameter derived from the direction parameter consisting of an azimuth angle and an elevation angle. Particularly, these angles are input into a VBAP (vector base amplitude panning) gain table 1011. The result is input into a loudspeaker gain averaging stage 1012, for each channel, and a further normalizer 1013 and the resulting gain parameter is then forwarded to the amplifier or gain adjuster in the direct signal branch 1015. The diffuse signal generated at the output of a decorrelator 1016 and the direct signal or non-diffuse stream are combined in a combiner 1017 and, then, the other subbands are added in another combiner 1018 which can, for example, be a synthesis filter bank. Thus, a loudspeaker signal for a certain loudspeaker is generated and the same procedure is performed for the other channels for the other loudspeakers 1019 in a certain loudspeaker setup.

The high-quality version of DirAC synthesis is illustrated in FIG. 12*b*, where the synthesizer receives all B-format signals, from which a virtual microphone signal is computed for each loudspeaker direction. The utilized directional pattern is typically a dipole. The virtual microphone signals are then modified in non-linear fashion depending on the metadata as discussed with respect to the branches 1016 and 1015. The low-bit-rate version of DirAC is not shown in FIG. 12*b*. However, in this low-bit-rate version, only a single channel of audio is transmitted. The difference in processing is that all virtual microphone signals would be replaced by this single channel of audio received. The virtual microphone signals are divided into two streams, the diffuse and non-diffuse streams, which are processed separately. The non-diffuse sound is reproduced as point sources by using vector base amplitude panning (VBAP). In panning, a monophonic sound signal is applied to a subset of loudspeakers after multiplication with loudspeaker-specific gain factors. The gain factors are computed using the information of a loudspeaker setup and a specified panning direction. In the low-bit-rate version, the input signal is simply panned to the directions implied by the metadata. In the high-quality version, each virtual microphone signal is multiplied with the corresponding gain factor, which produces the same effect with panning, however, it is less prone to any non-linear artifacts.

The aim of the synthesis of the diffuse sound is to create perception of sound that surrounds the listener. In the low-bit-rate version, the diffuse stream is reproduced by decorrelating the input signal and reproducing it from every loudspeaker. In the high-quality version, the virtual microphone signals of the diffuse streams are already incoherent in some degree, and they need to be decorrelated only mildly.

The DirAC parameters, also called spatial metadata, consist of tuples of diffuseness and direction, which in spherical coordinates is represented by two angles, the azimuth and the elevation. If both analysis and synthesis stage are run at the decoder side the time-frequency resolution of the DirAC parameters can be chosen to be the same as the filter bank used for the DirAC analysis and synthesis, i.e. a distinct parameter set for every time slot and frequency bin of the filter bank representation of the audio signal.

Some work has been done for reducing the size of metadata for enabling the DirAC paradigm to be used for spatial audio coding and in teleconference scenarios [Hirvonen2009].

In [WO2019068638], a universal spatial audio coding system based on DirAC was introduced. In contrast to classical DirAC, which is designed for B-format (a first-order Ambisonics format) input, this system can accept first- or higher-order Ambisonics, multi-channel, or object-based audio input and also allows mixed-type input signals. All signal types are efficiently coded and transmitted either in an individual or a combined manner. The former combines the different representations at the renderer (decoder-side), while the latter uses an encoder-side combination of the different audio representations in the DirAC domain.

Compatibility with DirAC Framework

The present embodiment builds upon the unified framework for arbitrary input types as presented in [WO2019068638] and—similarly to what [WO2020249815] does for multi-channel content—aims to eliminate the problem of not being able to efficiently apply the DirAC parameters (direction and diffuseness) to object input. In fact, the diffuseness parameter is not needed at all, whereas it was found that a single directional cue per time/frequency unit is insufficient to reproduce high-quality object content. This embodiment therefore proposes to employ multiple directional cues per time/frequency unit and, accordingly, introduces an adapted parameter set that replaces the classical DirAC parameters in the case of object input.

Flexible System at Low Bitrates

In contrast to DirAC, which uses a scene-based representation from the listener's perspective, SAOC and SAOC-3D are designed for channel- and object-based content, where the parameters describe the relationships between the channels/objects. To use a scene-based representation for object input and thus be compatible with DirAC renderers, while at the same time ensuring an efficient representation and high-quality reproduction, an adapted set of parameters is needed to also allow for signaling multiple directional cues.

An important goal of this embodiment was to find a way to efficiently code object input with low bitrates and with a good scalability for an increasing number of objects. Discretely coding each object signal cannot offer such a scalability: each additional object causes the overall bitrate to rise significantly. If the allowed bitrate is exceeded by an increased number of objects, this will directly result in a very audible degradation of the output signals; this degradation is yet another argument in favor of this embodiment.

SUMMARY

According to an embodiment, an apparatus for encoding a plurality of audio objects may have: an object parameter calculator configured for calculating, for one or more frequency bins of a plurality of frequency bins related to a time frame, parameter data for at least two relevant audio objects, wherein a number of the at least two relevant audio objects is lower than a total number of the plurality of audio objects, wherein the object parameter calculator is configured for performing a selection of the number of the at least two relevant audio objects and for not indicating the total number of audio objects as being relevant, and an output interface for outputting an encoded audio signal having information on the parameter data for the at least two relevant audio objects.

According to another embodiment, a decoder for decoding an encoded audio signal having one or more transport channels and direction information for a plurality of audio objects, and, for one or more frequency bins of a time frame, parameter data for at least two relevant audio objects, wherein a number of the at least two relevant audio objects is lower than a total number of the plurality of audio objects, wherein the number of the at least two relevant audio objects is a selection from the total number of audio objects, wherein the total number of audio objects is not indicated as being relevant, may have: an input interface for providing the one or more transport channels in a spectral representation having, in the time frame, the plurality of frequency bins; and an audio renderer for rendering the one or more transport channels into a number of audio channels using the direction information, so that a contribution from the one or more transport channels in accordance with a first direction information associated with a first one of the at least two relevant audio objects and in accordance with a second direction information associated with a second one of the at least two relevant audio objects is accounted for, or wherein the audio renderer is configured to calculate, for each one of the one or more frequency bins, a contribution from the one or more transport channels in accordance with a first direction information associated with a first one of the at least two relevant audio objects and in accordance with a second direction information associated with a second one of the at least two relevant audio objects.

According to another embodiment, a method of encoding a plurality of audio objects may have the steps of: calculating, for one or more frequency bins of a plurality of frequency bins related to a time frame, parameter data for at least two relevant audio objects, wherein a number of the at least two relevant audio objects is lower than a total number of the plurality of audio objects, wherein the calculating has performing a selection of the number of the at least two relevant audio objects and not indicating the total number of audio objects as being relevant, and outputting an encoded audio signal having information on the parameter data for the at least two relevant audio objects.

According to another embodiment, a method of decoding an encoded audio signal having one or more transport channels and direction information for a plurality of audio objects, and, for one or more frequency bins of a time frame, parameter data for at least two relevant audio objects, wherein a number of the at least two relevant audio objects is lower than a total number of the plurality of audio objects, wherein the number of the at least two relevant audio objects is a selection from the total number of audio objects, wherein the total number of audio objects is not indicated as being relevant, may have the steps of: providing the one or more transport channels in a spectral representation having, in the time frame, the plurality of frequency bins; and audio rendering the one or more transport channels into a number of audio channels using the direction information, wherein the audio rendering has calculating, for each one of the one or more frequency bins, a contribution from the one or more transport channels in accordance with a first direction information associated with a first one of the at least two relevant audio objects and in accordance with a second direction information associated with a second one of the at least two relevant audio objects, or so that a contribution from the one or more transport channels in accordance with a first direction information associated with a first one of the at least two relevant audio objects and in accordance with a second direction information associated with a second one of the at least two relevant audio objects is accounted for.

Another embodiment may have a non-transitory digital storage medium having stored thereon a computer program for performing a method of encoding a plurality of audio objects having the steps of: calculating, for one or more frequency bins of a plurality of frequency bins related to a time frame, parameter data for at least two relevant audio objects, wherein a number of the at least two relevant audio objects is lower than a total number of the plurality of audio objects, wherein the calculating has performing a selection of the number of the at least two relevant audio objects and not indicating the total number of audio objects as being relevant, and outputting an encoded audio signal having information on the parameter data for the at least two relevant audio objects, when said computer program is run by a computer.

Still another embodiment may have a non-transitory digital storage medium having stored thereon a computer program for performing a method of decoding an encoded audio signal having one or more transport channels and direction information for a plurality of audio objects, and, for one or more frequency bins of a time frame, parameter data for at least two relevant audio objects, wherein a number of the at least two relevant audio objects is lower than a total number of the plurality of audio objects, wherein the number of the at least two relevant audio objects is a selection from the total number of audio objects, wherein the total number of audio objects is not indicated as being relevant, having the steps of: providing the one or more transport channels in a spectral representation having, in the time frame, the plurality of frequency bins; and audio rendering the one or more transport channels into a number of audio channels using the direction information, wherein the audio rendering has calculating, for each one of the one or more frequency bins, a contribution from the one or more transport channels in accordance with a first direction information associated with a first one of the at least two relevant audio objects and in accordance with a second direction information associated with a second one of the at least two relevant audio objects, or so that a contribution from the one or more transport channels in accordance with a first direction information associated with a first one of the at least two relevant audio objects and in accordance with a second direction information associated with a second one of the at least two relevant audio objects is accounted for, when said computer program is run by a computer.

Another embodiment may have an encoded audio signal having information on the parameter data for at least two relevant audio objects for one or more frequency bins of a plurality of frequency bins related to a time frame, wherein a number of the at least two relevant audio objects is a selection from a total number of audio objects, wherein the total number of audio objects is not indicated as being relevant.

In one aspect of the present invention, the present invention is based on the finding that for one or more frequency bins of a plurality of frequency bins, at least two relevant audio objects are defined and parameter data relating to these at least two relevant objects are included on the encoder-side and are used on the decoder-side to obtain a high quality but efficient audio encoding/decoding concept.

In accordance with a further aspect of the present invention, the invention is based on the finding that a specific downmix adapted to the direction information associated with each object is performed so that each object that has associated direction information being valid for the whole object, i.e., for all frequency bins in a time frame, is used for downmixing this object into a number of transport channels. The usage of the direction information is, for example, equivalent to the generation of the transport channels as virtual microphone signals having certain adjustable characteristics.

On the decoder-side, a specific synthesis is performed that relies on the covariance synthesis which is in specific embodiments, particularly suited for a high quality covariance synthesis that does not suffer from decorrelator-introduced artifacts. In other embodiments, an advanced covariance synthesis is used that relies on specific improvements related to the standard covariance synthesis in order to improve the audio quality and/or reduce the amount of calculations entailed for calculating the mixing matrix used within the covariance synthesis.

However, even in a more classical synthesis where the audio rendering is done by explicitly determining the individual contributions within a time/frequency bin based on a transmitted selection information the audio quality is superior with respect to known object coding approaches or channel downmix approaches. In such a situation, each time/frequency bin has an object identification information, and, when performing the audio rendering, i.e., when accounting for the direction contribution of each object, this object identification is used in order to look-up the direction associated with this object information in order to determine the gain values for the individual output channels per time/frequency bin. Thus, when there is only a single relevant object in a time/frequency bin, then only the gain values for this single object per time/frequency bin are determined based on the object ID and the "codebook" of direction information for the associated objects.

When, however, there are more than 1 relevant objects in the time/frequency bin, then gain values for each relevant object are calculated in order to have the distribution of the corresponding time/frequency bin of the transport channel into the corresponding output channels governed by a user-provided output format such as a certain channel format being a stereo format, a 5.1 format, etc. Irrespective of whether the gain values are used for the purpose of covariance synthesis, i.e., for the purpose of applying a mixing matrix for mixing the transport channels into the output channels, or whether the gain values are used for explicitly determining the individual contributions for each object in a time/frequency bin by multiplying the gain values by the corresponding time/frequency bin of one or more transport channels and then summing up the contributions for each output channel in the corresponding time/frequency bin, probably enhanced by the addition of a diffuse signal component, the output audio quality is nevertheless enhanced because of the flexibility given by determining one or more relevant objects per frequency bin.

This determination is very efficiently possible, since only one or more object IDs for a time/frequency bin have to be encoded and transmitted to the decoder together with the direction information per object that, however, is also very efficiently possible. This is due to the fact that there is, for a frame, only a single direction information for all frequency bins.

Thus, irrespective of whether the synthesis is done using an advantageously enhanced covariance synthesis or using a combination of explicit transport channel contributions per each object, a high efficiency and high quality object downmix is obtained that is advantageously enhanced by using a specific object direction-dependent downmix relying on weights for the downmix that are reflecting the generation of the transport channels as virtual microphone signals.

The aspect related to the two or more relevant objects per time/frequency bin can be advantageously combined with the aspect of performing a specific direction-dependent downmix of the objects into transport channels. However, both aspects can also be applied independently from each other. Furthermore, although a covariance synthesis with two or more relevant objects per time/frequency bin is performed in certain embodiments, the advanced covariance synthesis and the advanced transport channel-to-output channel upmix can also be performed by transmitting only a single object identification per time/frequency bin.

Furthermore, irrespective of whether there is a single or several relevant objects per time/frequency bin, the upmixing can also be performed by the calculation of a mixing matrix within a standard or enhanced covariance synthesis, or the upmixing can be performed with an individual determination of the contribution of a time/frequency bin based on an object identification used for retrieving, from a direction "codebook" the certain direction information to determine the gain values for the corresponding contributions. These are then summed up in order to have the full contribution per time/frequency bin, in case of two or more relevant objects per time/frequency bin. The output of this summing up step is then equivalent to the output of the mixing matrix application and a final filterbank processing is performed in order to generate the time domain output channel signals for the corresponding output format.

BRIEF DESCRIPTION OF THE DRAWINGS

Embodiments of the present invention are subsequently described with respect to the accompanying drawings, in which.

DETAILED DESCRIPTION OF THE INVENTION

Figure 1A:
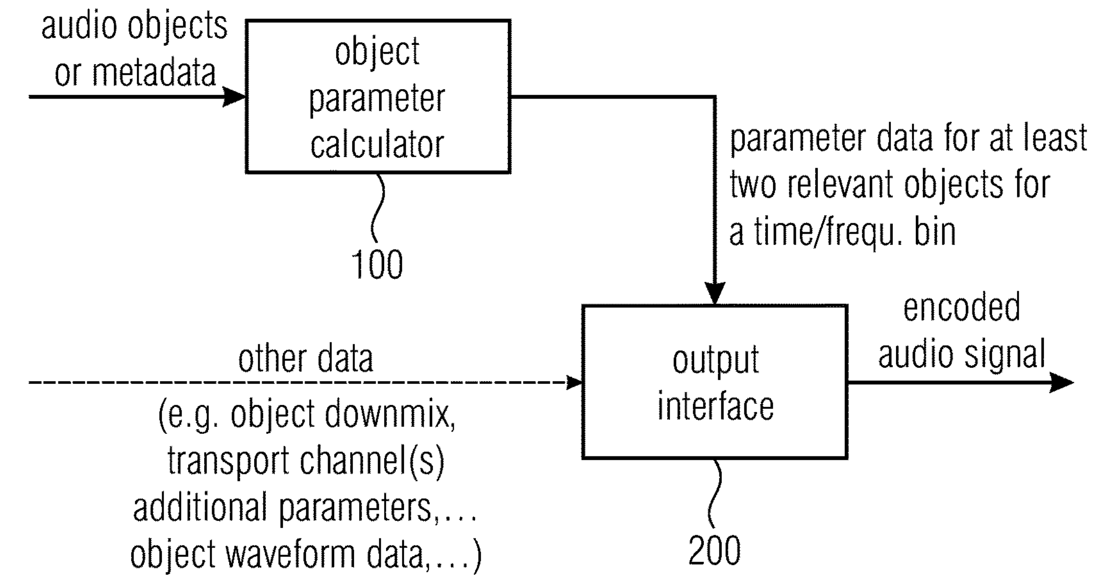
FIG. 1*a* is an implementation of an audio encoder in accordance with the first aspect of having at least two relevant objections per time/frequency bin.

FIG. 1*a* illustrates an apparatus for encoding a plurality of audio objects that receives, at an input, the audio objects as they are and/or metadata for the audio objects. The encoder comprises an object parameter calculator 100 that provides parameter data for at least two relevant audio objects for a time/frequency bin, and this data is forwarded to an output interface 200. Particularly, the object parameter calculator calculates, for one or more frequency bins of a plurality of frequency bins related to a time frame the parameter data for the at least two relevant audio objects, where, specifically, a number of the at least two relevant audio objects is lower than a total number of the plurality of audio objects. Thus, the object parameter calculator 100 actually performs a selection and does not simply indicate all objects as being relevant. In advantageous embodiments, the selection is done by means of the relevance and the relevance is determined by means of an amplitude-related measure such as an amplitude, a power, a loudness or another measure obtained by raising the amplitude to a power different from one and advantageously greater than 1. Then, if a certain number of relevant objects are available for a time/frequency bin, the objects having the most relevant characteristic, i.e., having the highest power among all objects are selected and data on these selected objects are included in the parameter data.

The output interface 200 is configured for outputting an encoded audio signal that comprises information on the parameter data for the at least two relevant audio objects for the one or more frequency bins. Depending on the implementation, the output interface may receive and input into the encoded audio signal other data such as an object downmix or one or more transport channels representing the object downmix or additional parameters or object waveform data being in the mixed representation where several objects are downmixed, or other objects being in a separate representation. In this situation, objects are directly introduced or "copied" into corresponding transport channels.

Figure 1B:
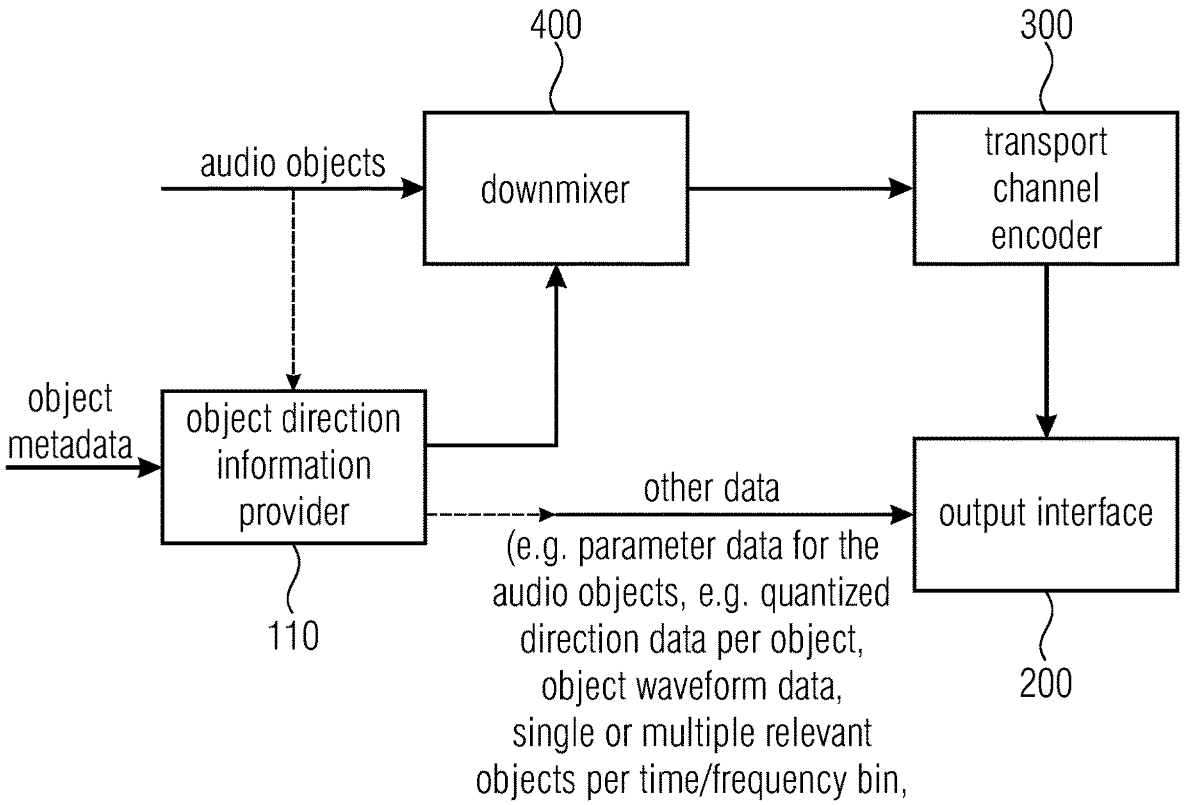
FIG. 1*b* is an implementation of an encoder in accordance with the second aspect of having a direction-dependent object downmix.

FIG. 1*b* illustrates an advantageous implementation of an apparatus for encoding a plurality of audio objects in accordance with a second aspect where the audio objects are received together with related object metadata that indicate the direction information on the plurality of audio objects, i.e., one direction information for each object or for a group of objects if the group of objects have associated thereto the same direction information. The audio objects are input into a downmixer 400 for downmixing the plurality of audio objects to obtain one or more transport channels. Furthermore, a transport channel encoder 300 is provided that encodes the one or more transport channels to obtain one or more encoded transport channels that are then input into an output interface 200. Particularly, the downmixer 400 is connected to an object direction information provider 110 that receives, at an input, any data, from which the object metadata can be derived and outputs the direction information actually used by the downmixer 400. The direction information forwarded from the object direction information provider 110 to the downmix 400 is advantageously a dequantized direction information, i.e., the same direction information that is then available at the decoder-side. To this end, the object direction information provider 110 is configured to derive or extract or retrieve non-quantized object metadata, to then quantize the object metadata to derive a quantized object metadata representing a quantization index that is, in advantageous embodiments, provided to the output interface 200 among the "other data" illustrated in FIG. 1*b*. Furthermore, the object direction information provider 110 is configured to dequantize the quantized object direction information in order to obtain the actual direction information forwarded from block 110 to the downmixer 400.

Advantageously, the output interface 200 is configured to additionally receive parameter data for the audio objects, object waveform data, an identification or several identifications for a single or multiple relevant objects per time/frequency bins and, as discussed before, quantized direction data.

Subsequently, further embodiments are illustrated. A parametric approach for coding audio object signals is presented that allows an efficient transmission at low bitrates as well as a high-quality reproduction at the consumer side. Based on the DirAC principle of considering one directional cue per critical frequency band and time instant (time/frequency tile), a most dominant object is determined for each such time/frequency tile of the time/frequency representation of the input signals. As this proved insufficient for object input, an additional, second most dominant object is determined per time/frequency tile and based on these two objects, power ratios are calculated to determine the impact of each of the two objects on the considered time/frequency tile. Note: Considering more than the two most dominant objects per time/frequency unit is also conceivable, especially for an increasing number of input objects. For simplicity, the following descriptions are mostly based on two dominant objects per time/frequency unit.

The parametric side information transmitted to the decoder thus comprises:

- The power ratios calculated for a subset of relevant (dominant) objects for each time/frequency tile (or parameter band).
- Object indices that represent the subset of relevant objects for each time/frequency tile (or parameter band).
- Direction information which is associated with the object indices and provided for each frame (where each time-domain frame comprises multiple parameter bands and each parameter band comprises multiple time/frequency tiles).

The direction information is made available via the input metadata files associated with the audio object signals. The metadata may be specified on a frame basis, for example. Apart from the side information, a downmix signal that combines the input object signals is also transmitted to the decoder.

During the rendering stage, the transmitted direction information (derived via the object indices) is used to pan the transmitted downmix signal (or more generally: the transport channels) to the appropriate directions. The downmix signal is distributed to the two relevant object directions based on the transmitted power ratios, which are used as weighting factors. This processing is conducted for each time/frequency tile of the time/frequency representation of the decoded downmix signal.

This section gives a summary of the encoder-side processing, followed by a detailed description of the parameter and downmix calculation. The audio encoder receives one or more audio object signals. To each audio object signal, a metadata file describing the object properties is associated. In this embodiment, the object properties described in the associated metadata files correspond to direction information which is provided on a frame basis, where one frame corresponds to 20 milliseconds. Each frame is identified by a frame number, also contained in the metadata files. The direction information is given as azimuth and elevation information, where the azimuth takes a value from (−180, 180] degrees and the elevation takes a value from [−90, 90] degrees. Further properties provided in the metadata may include distance, spread, gain, for example; these properties are not taken into account in this embodiment.

The information provided in the metadata files is used together with the actual audio object files to create a set of parameters that is transmitted to the decoder and used to render the final audio output files. More specifically, the encoder estimates the parameters, i.e., the power ratios, for a subset of dominant objects for each given time/frequency tile. The subset of dominant objects is represented by object indices, which are also used to identify the object direction. These parameters are transmitted to the decoder along with the transport channels and the direction metadata.

Figure 2:
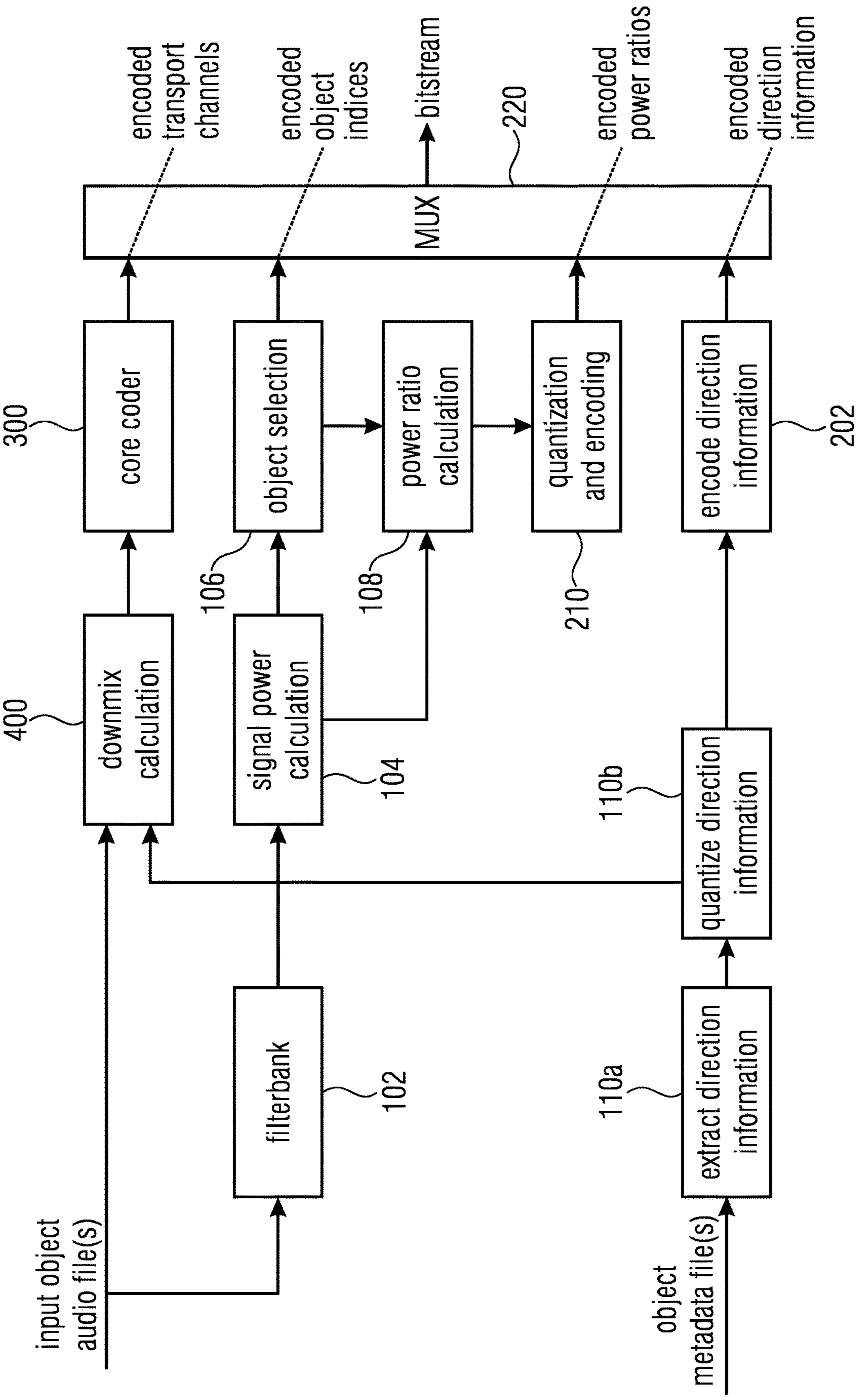
FIG. 2 is an advantageous implementation of an encoder in accordance with the second aspect.

An overview of the encoder is given in FIG. 2, where the transport channels comprise a downmix signal calculated from the input object files and the direction information provided in the input metadata. The number of transport channels is always less than the number of input object files. In the encoder of an embodiment, the encoded audio signal is represented by the encoded transport channels and the encoded parametric side information is indicated by encoded object indices, encoded power ratios and encoded direction information. Both the encoded transport channels and the encoded parametric side information together form a bitstream output by a multiplexer 220. Particularly, the encoder comprises a filterbank 102 receiving the input object audio files. Furthermore, object metadata files are provided to an extractor direction information block 110*a*. The output of block 110*a* is input into a quantize direction information block 110*b* that outputs the direction information to the downmixer 400 that performs the downmix calculation. Furthermore, the quantized direction information, i.e., the quantization index is forwarded from block 110*b* to an encode direction information 202 block that advantageously performs some kind of entropy coding in order to further reduce the entailed bitrate.

Furthermore, the output of the filterbank 102 is input into a signal power calculation block 104, and the output of the signal power calculation block 104 is input into an object selection block 106 and additionally into a power ratio calculation block 108. The power ratio calculation block 108 is also connected to the object selection block 106, in order to calculate the power ratios, i.e., the combined values for only the selected objects. In block 210, the calculated power ratios or combined values are quantized and encoded. As will be outlined later on, power ratios are advantageous in order to save the transmission of one power data item. However, in other embodiments where this saving is not necessary, instead of the power ratios, the actual signal power is or other values derived from the signal powers determined by block 104 can be input into the quantizer and encoder under the selection of the object selector 106. Then, the power ratio calculation 108 is not required and the object selection 106 makes sure that only the relevant parametric data, i.e., power-related data for the relevant objects are input into block 210 for the purpose of quantization and encoding.

Comparing FIG. 1*a* with FIG. 2, the blocks 102, 104, 110*a*, 110*b*, 106, 108 are advantageously included in the object parameter calculator 100 of FIG. 1*a*, and blocks 202, 210, 220 are advantageously included within the output interface block 200 of FIG. 1*a*.

Furthermore, the core coder 300 in FIG. 2 corresponds to the transport channel encoder 300 of FIG. 1*b*, the downmix calculation block 400 corresponds to the downmixer 400 of FIG. 1*b*, and the object direction information provider 110 of FIG. 1*b* corresponds to blocks 110*a*, 110*b* of FIG. 2. Furthermore, the output interface 200 of FIG. 1*b* is advantageously implemented in the same way as the output interface 200 of FIG. 1*a* and comprises blocks 202, 210, 220 of FIG. 2.

Figure 3:
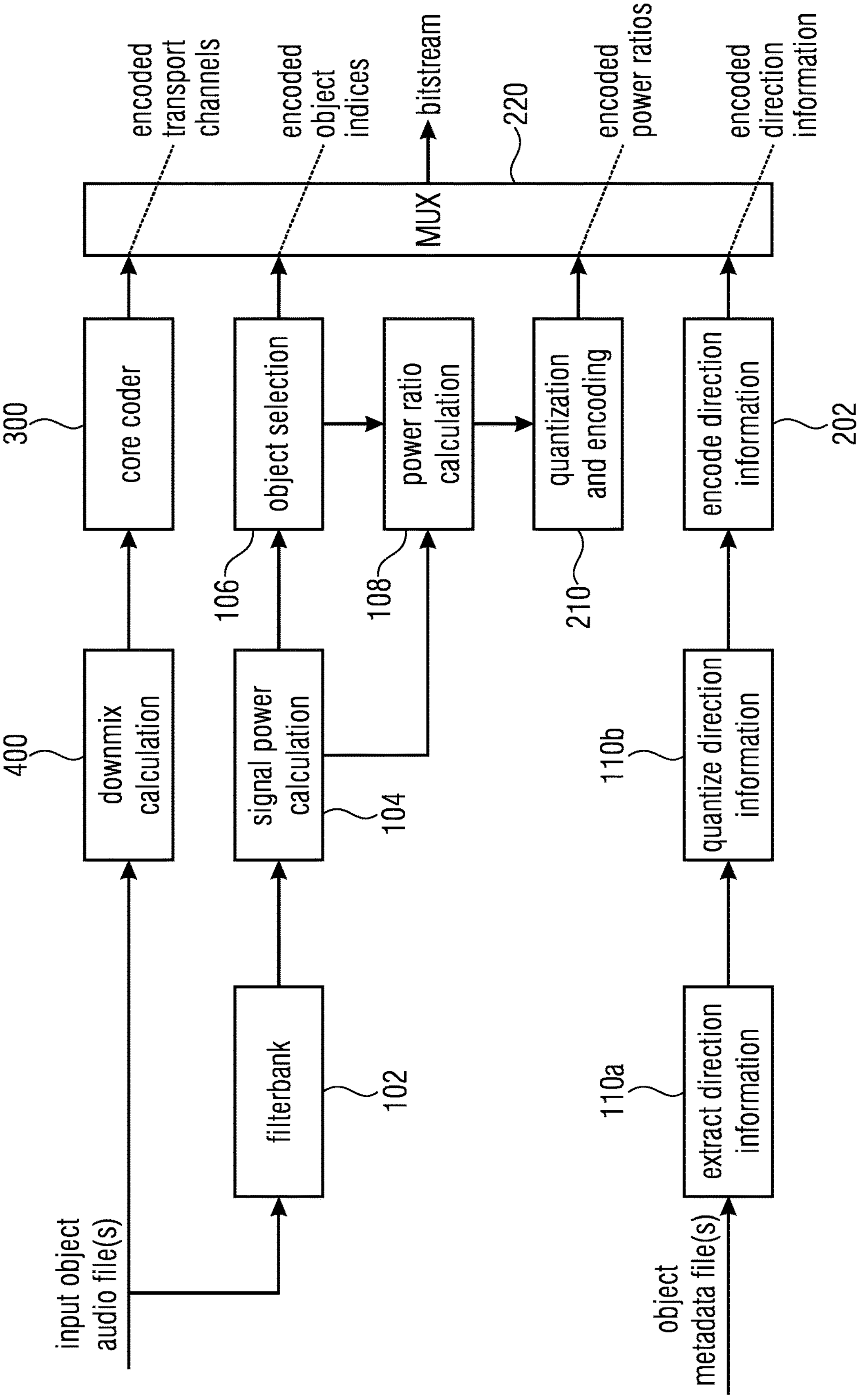
FIG. 3 is an advantageous implementation of an encoder in accordance with the first aspect.

FIG. 3 shows an encoder variant where the downmix calculation is optional and does not rely on the input metadata. In this variant, the input audio files may be fed directly into the core coder which creates the transport channels from them and the number of transport channels thus corresponds to the number of input object files; this is especially interesting if the number of input objects is 1 or 2. For larger numbers of objects, a downmix signal will still be used to reduce the amount of data to transmit.

In FIG. 3, similar reference numbers refer to similar functionalities of FIG. 2. This is not only valid with respect to FIG. 2 and FIG. 3, but is also valid to all other figures described in this specification. Different from FIG. 2, FIG. 3 performs a downmix calculation 400 without any direction information. Thus, the downmix calculation can be a static downmix using a pre-known downmix matrix, for example, or can be an energy-dependent downmix that does not depend on any direction information associated with the objects included in the input object audio files. Nevertheless, the direction information is extracted in block 110*a* and is quantized in block 110*b* and the quantized values are forwarded to the direction information encoder 202 for the purpose of having the encoded direction information in the encoded audio signal that is, for example, a binary encoded audio signal forming the bitstream.

In case of having a not too high number of input audio object files or in case of having enough available transmission bandwidth, the downmix calculation block 400 may also be dispensed with so that input audio object files directly represent the transport channels that are encoded by the core encoder. In such an implementation, blocks 104, 104, 106, 108, 210 are also not necessary. However, an advantageous implementation results in a mixed implementation where some objects are directly introduced into transport channels and other objects are downmixed into one or more transport channels. In such a situation, then all the blocks illustrated in FIG. 3 will be used in order to generate a bitstream having, within the encoded transport channels one or more objects directly and one or more transport channels generated by the downmixer 400 either of FIG. 2 or of FIG. 3.

Parameter Computation

The time-domain audio signal, comprising all input object signals, is converted into the time/frequency domain using a filterbank. For example: A CLDFB (complex low-delay filterbank) analysis filter converts frames of 20 milliseconds (corresponding to 960 samples at a sampling rate of 48 kHz) into time/frequency tiles of size 16×60, with 16 time slots and 60 frequency bands. For each time/frequency unit, the instantaneous signal power is computed as $$P_i(k,n)=|X_i(k,n)|^2,$$

where k denotes the frequency band index, n denotes the time slot index and i denotes the object index. Since transmitting parameters for each time/frequency tile is very costly in terms of the final bitrate, a grouping is employed so as to compute the parameters for a reduced number of time/frequency tiles. For example: 16 time slots can be grouped together into a single time slot and 60 frequency bands can be grouped based on a psychoacoustic scale into 11 bands. This reduces the initial dimension of 16×60 to 1×11, which corresponds to 11 so-called parameter bands. The instantaneous signal power values are summed up based on the grouping to obtain the signal powers in the reduced dimension:

$$P_i(l,m)=\sum_{k=0}^{T}\sum_{n=B_S}^{n=B_E}P_i(k,n),$$

where T corresponds to 15 in this example and $B_S$ and $B_E$ define the parameter band borders.

To determine the subset of most dominant objects for which to compute the parameters, the instantaneous signal power values of all N input audio objects are sorted in descending order. In this embodiment, we determine the two most dominant objects and the corresponding object indices, ranging from 0 to N−1, are stored as part of the parameters to be transmitted. Furthermore, power ratios are computed that relate the two dominant object signals to each other:

$$PR_1(l, m) = \frac{P_1(l, m)}{(P_1(l, m) + P_2(l, m))}$$

$$PR_2(l, m) = \frac{P_2(l, m)}{(P_1(l, m) + P_2(l, m))} = 1 - PR_1(l, m)$$

Or in a more general expression that is not limited to two objects:

$$PR_i(l, m) = \frac{P_i(l, m)}{\sum_{j=1}^{S} P_j(l, m)}$$

where, in this context, S denotes the number of dominant objects to be considered, and:

$$\sum_{i=1}^{S} PR_i(l, m) = 1$$

In the case of two dominant objects, power ratios of 0.5 for each of the two objects mean that both objects are equally present within the corresponding parameter band, while power ratios of 1 and 0 describe the absence of one of the two objects. These power ratios are stored as the second part of the parameters to be transmitted. Since the power ratios sum up to 1, it is sufficient to transmit S−1 values instead of S.

In addition to the object indices and the power ratio values per parameter band, the direction information of each object as extracted from the input metadata files has to be transmitted. As the information is originally provided on a frame basis, this is done for each frame (where each frame comprises 11 parameter bands or a total of 16×60 time/frequency tiles in the described example). The object indices thus indirectly represent the object direction. Note: As the power ratios sum up to 1, the number of power ratios to be transmitted per parameter band may be reduced by 1; for example: transmitting 1 power ratio value is enough in case of considering 2 relevant objects.

Both the direction information and the power ratio values are quantized and combined with the object indices to form the parametric side information. This parametric side information is then encoded, and—together with the encoded transport channels/the downmix signal—mixed into the final bitstream representation. A good tradeoff between output quality and expended bitrate is achieved by quantizing the power ratios using 3 bits per value, for example. The direction information may be provided with an angular resolution of 5 degrees and subsequently quantized with 7 bits per azimuth value and 6 bits per elevation value, to give a practical example.

Downmix Computation

All input audio object signals are combined into a downmix signal which comprises either one or more transport channels, where the number of transport channels is less than the number of input object signals. Note: In this embodiment, a single transport channel only occurs if there is only one input object, which then means that the downmix calculation is skipped.

If the downmix comprises two transport channels, this stereo downmix may, for example, be computed as a virtual cardioid microphone signal. The virtual cardioid microphone signal is determined by applying the direction information provided for each frame in the metadata files (here, it is assumed that all elevation values are zero):

$$w_L = 0.5 + 0.5 * \cos(\text{azimuth} - pi/2)$$

$$w_R = 0.5 + 0.5 * \cos(\text{azimuth} + pi/2)$$

Here, the virtual cardioids are located at 90° and −90°. Individual weights for each of the two transport channels (left and right) are thus determined and applied to the corresponding audio object signal:

$$DMX_L = \sum_{j \in N} x_j * w_L$$

$$DMX_R = \sum_{j \in N} x_j * w_R$$

In this context, N is the number of input objects greater than or equal to two. If the virtual cardioid weights are updated for each frame, a dynamic downmix is employed that adapts to the direction information. Another possibility is to employ a fixed downmix, where each object is assumed to be located at a static position. This static position may, for example, correspond to the initial direction of the object, which then leads to static virtual cardioid weights that are the same for all frames.

If the target bitrate allows, more than two transport channels are conceivable. In the case of three transport channels, the cardioids may then be uniformly arranged, e.g., at 0°, 120°, and −120°. If four transport channels are used, a fourth cardioid may face upwards or the four cardioids may again be arranged horizontally in a uniform manner. The arrangement could also be tailored towards the object positions if they are, for example, exclusively part of one hemisphere. The resulting downmix signal is processed by the core coder and—together with the encoded parametric side information—turned into a bitstream representation.

Alternatively, the input object signals may be fed into the core coder without being combined into a downmix signal. In this case, the number of resulting transport channels corresponds to the number of input object signals. Typically, a maximum number of transport channels is given that correlates with the total bitrate. A downmix signal is then only employed if the number of input object signals exceeds this maximum number of transport channels.

Figure 6A:
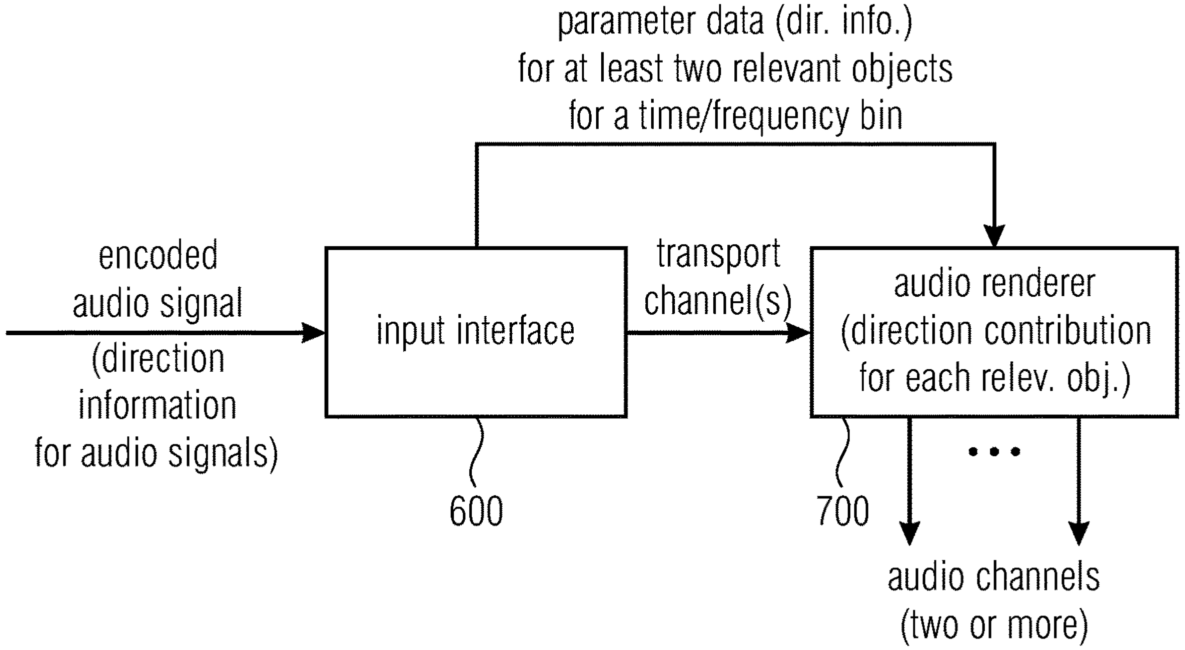
FIG. 6*a* is an implementation of a decoder in accordance with the first aspect.

FIG. 6*a* illustrates a decoder for decoding an encoded audio signal such as the signal output by FIG. 1*a* or FIG. 2 or FIG. 3 that comprises one or more transport channels and direction information for a plurality of audio objects. Additionally, the encoded audio signal comprises, for one or more frequency bins of a time frame, parameter data for at least two relevant audio objects, where the number of at least two relevant objects is lower than a total number of the plurality of audio objects. Particularly, the decoder comprises an input interface for providing the one or more transport channels in a spectral representation having, in the time frame, the plurality of frequency bins. This represents the signal forwarded from input interface block 600 to an audio renderer block 700. Particularly, the audio renderer 700 is configured for rendering the one or more transport channels into a number of audio channels using the direction information included in the encoded audio signal the number of audio channels are advantageously two channels for a stereo output format or more than two channels for a higher number output format such as 3 channels, 5 channels, 5.1 channels, etc. Particularly, the audio renderer 700 is configured to calculate, for each one of the one or more frequency bins, a contribution from the one or more transport channels in accordance with a first direction information associated with a first one of the at least two relevant audio objects and in accordance with a second direction information associated with a second one of the at least two relevant objects. Particularly, the direction information for the plurality of audio objects comprises a first direction information associated with a first object and a second direction information associated with a second object.

Figure 8A:
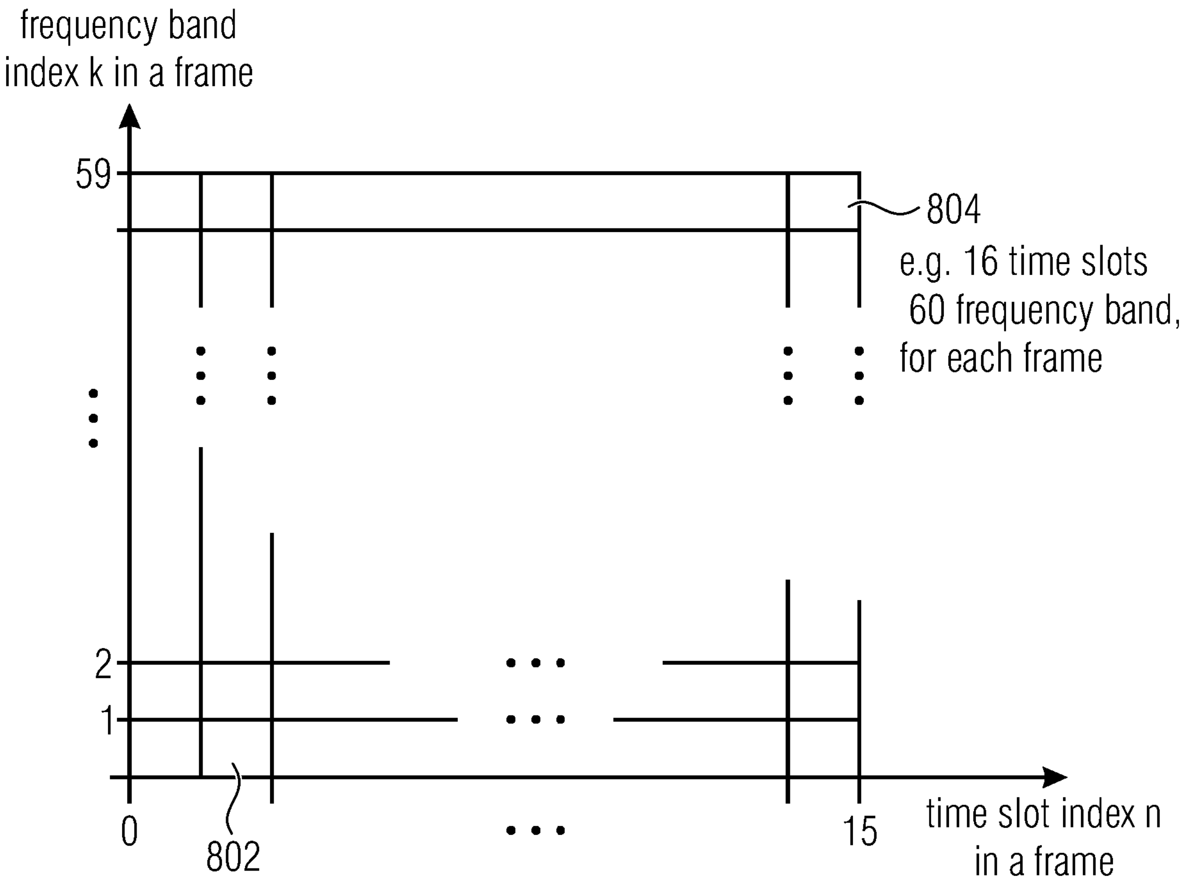
FIG. 8*a* illustrates a high resolution filterbank time/frequency representation.
Figures 8B, 8C:
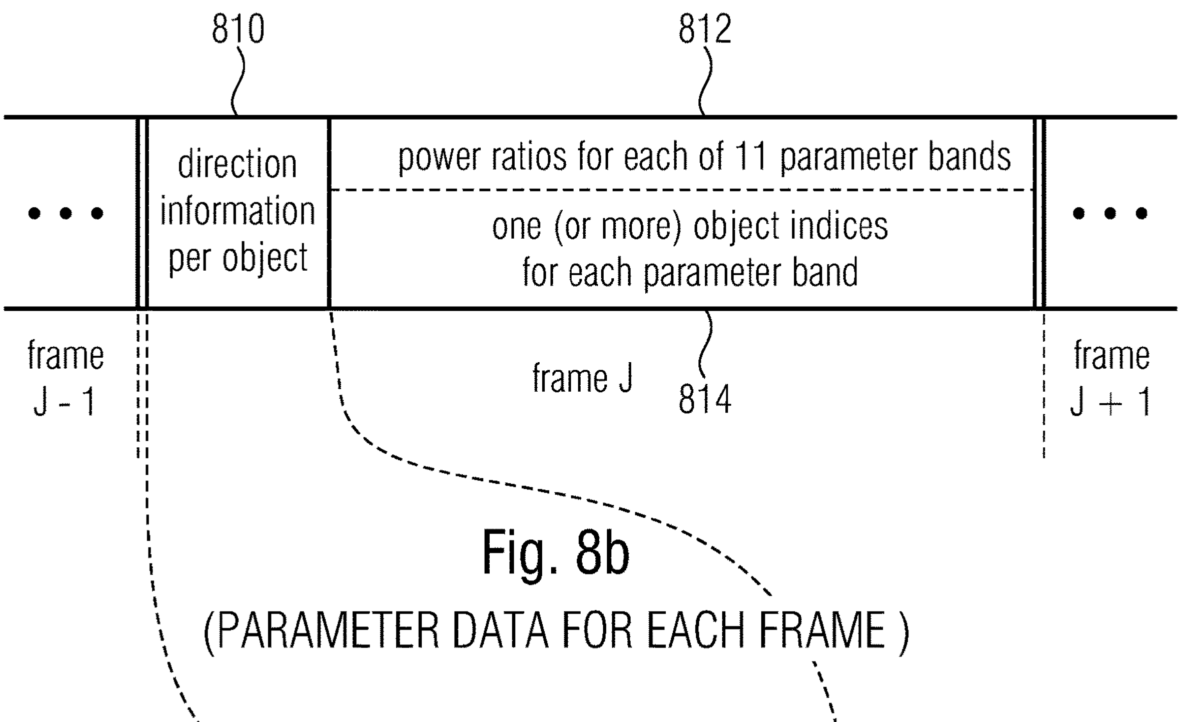
FIG. 8*b* illustrates the transmission of relevant side information for a frame J in accordance with advantageous implementation of the first and the second aspects.
FIG. 8*c* illustrates a "direction codebook" that is included in the encoded audio signal.
Figure 9A:
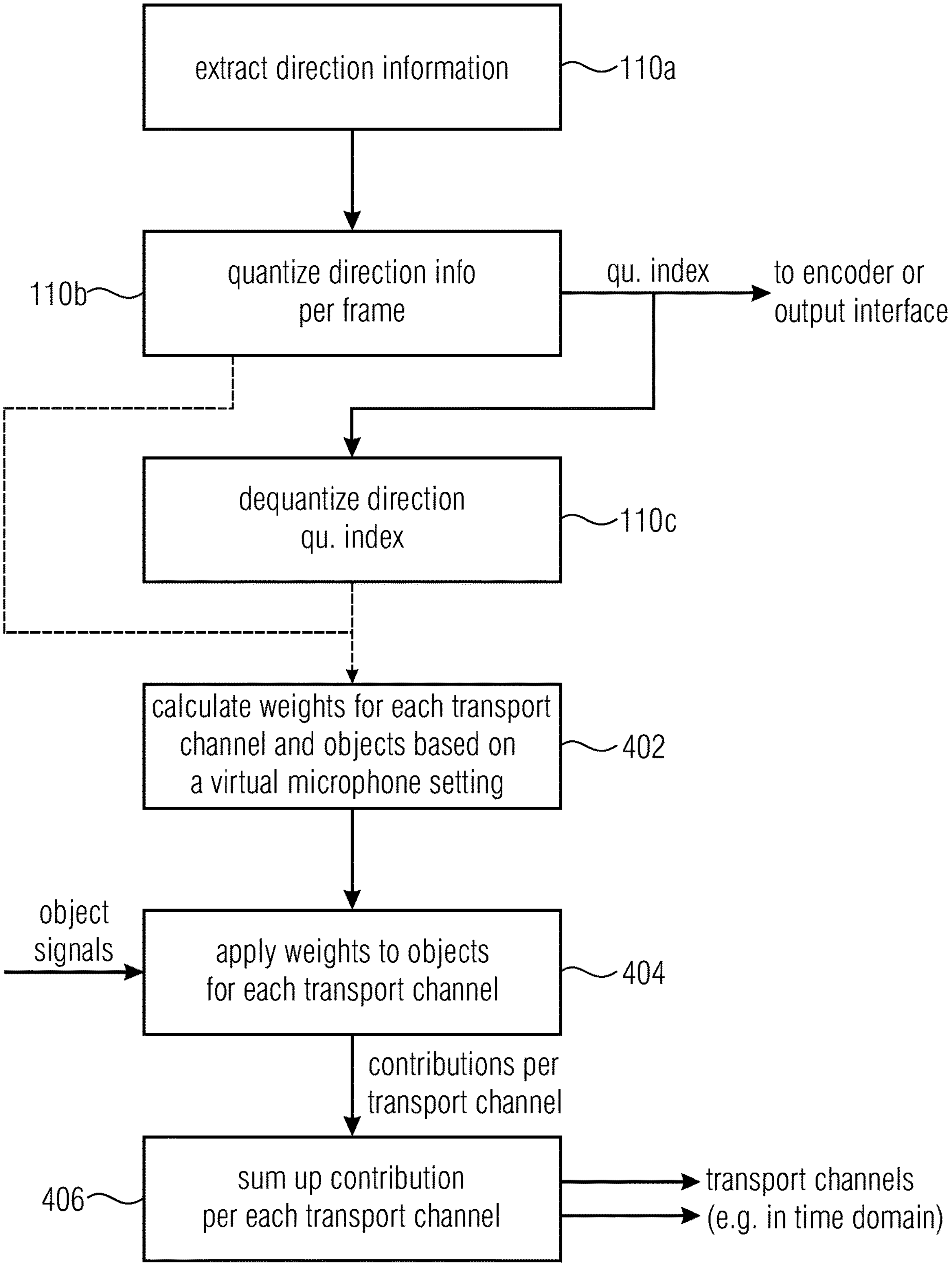
FIG. 9*a* illustrates an advantageous way of encoding in accordance with the second aspect.
Figure 9B:
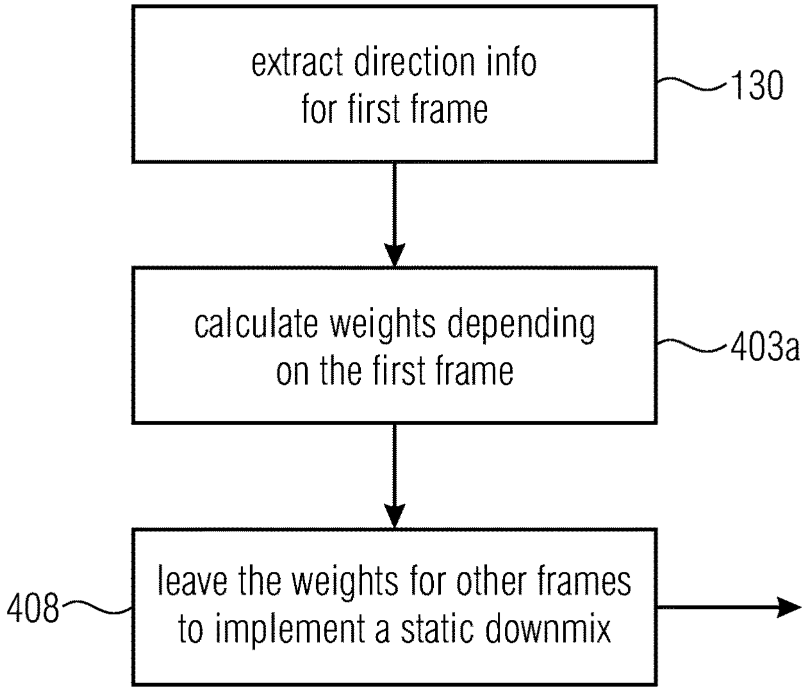
FIG. 9*b* illustrates an implementation of a static downmix in accordance with the second aspect.
Figure 9C:
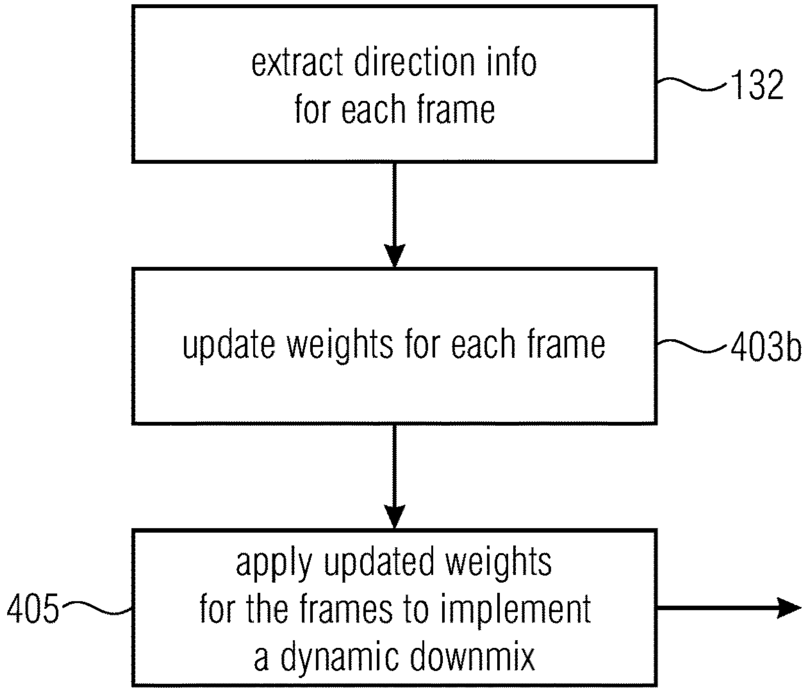
FIG. 9*c* illustrates an implementation of a dynamic downmix in accordance with the second aspect.
Figure 9D:
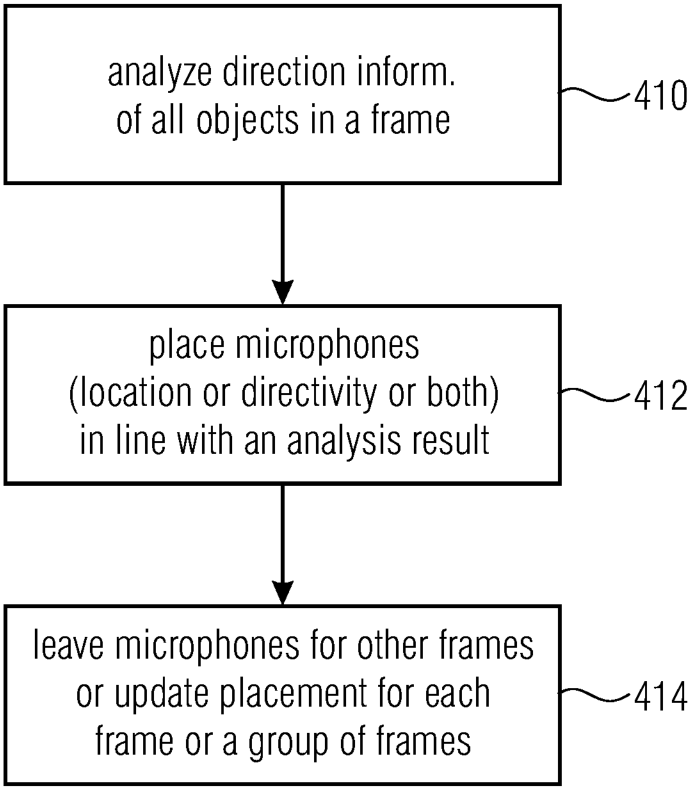
FIG. 9*d* illustrates a further embodiment of the second aspect.

FIG. 8*b* illustrates the parameter data for a frame consisting of, in an advantageous embodiment, the direction information 810 for the plurality of audio objects and, additionally, power ratios for each of a certain number of parameter bands illustrated at 812 and one, advantageously two or even more object indices for each parameter band indicated at block 814. Advantageously, the direction information for a plurality of audio objects 810 is illustrated in more detail in FIG. 8*c*. FIG. 8*c* illustrates a table with a first column having a certain object ID from 1 to N, where N is the number of the plurality of audio objects. Furthermore, a second column is provided that has the direction information for each object advantageously as an Azimuth value and elevation value or, in case of a two-dimensional situation, only an Azimuth value. This is illustrated at 818. Hence, FIG. 8*c* illustrates a "direction codebook" that is included in the encoded audio signal input into the input interface 600 of FIG. 6*a*. The direction information from column 818 is uniquely associated with a certain object ID from column 816, and is valid for the "whole" object in a frame, i.e., for all frequency bands in a frame. Thus, irrespective of the number of frequency bins be it time/frequency tiles in a high resolution representation or time/parameter bands in a lower resolution representation only a single direction information is to be transmitted and used by the input interface for each object identification.

Figure 10A:
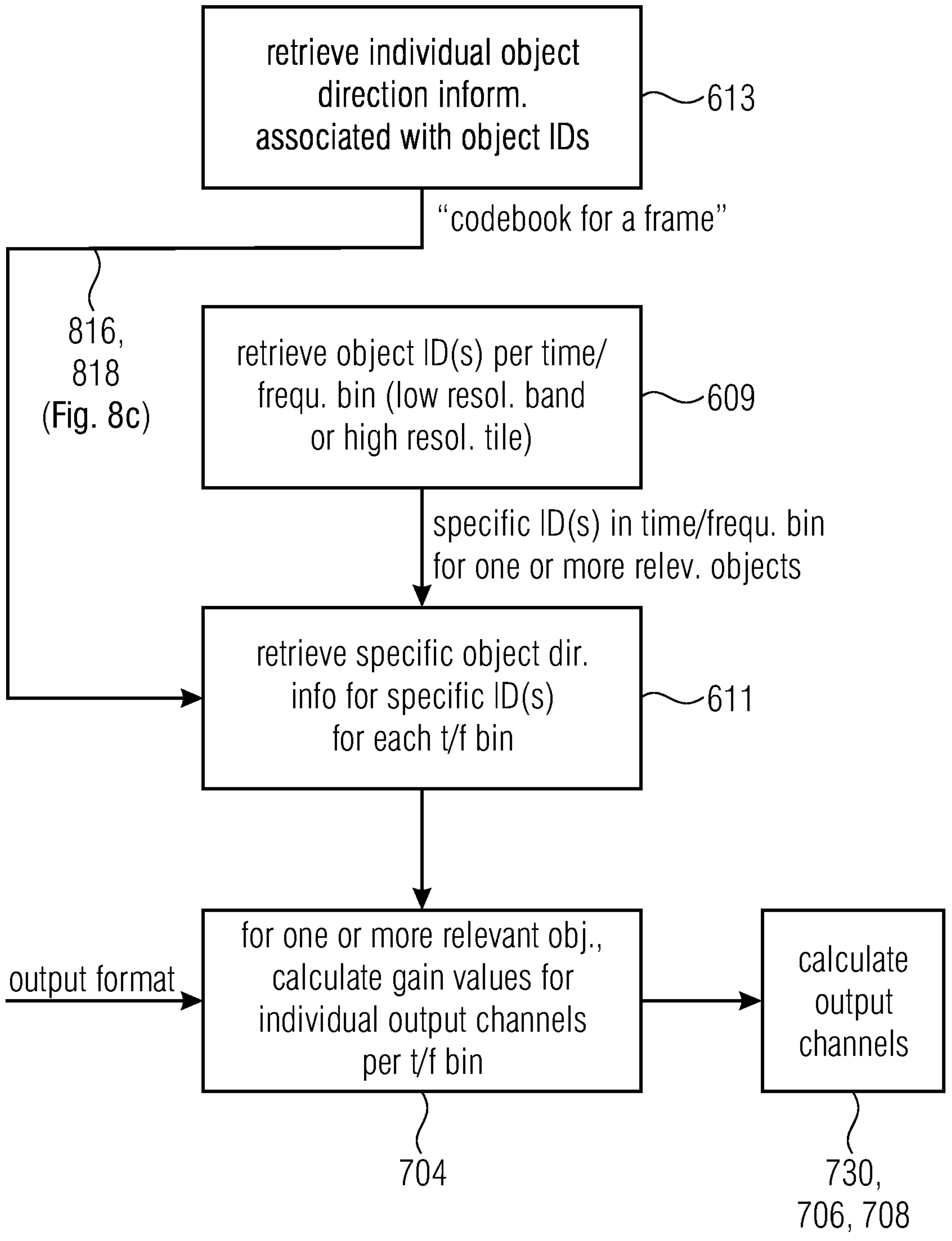
FIG. 10*a* illustrates a flowchart for an advantageous implementation of the decoder-side of the first aspect.
Figure 10B:
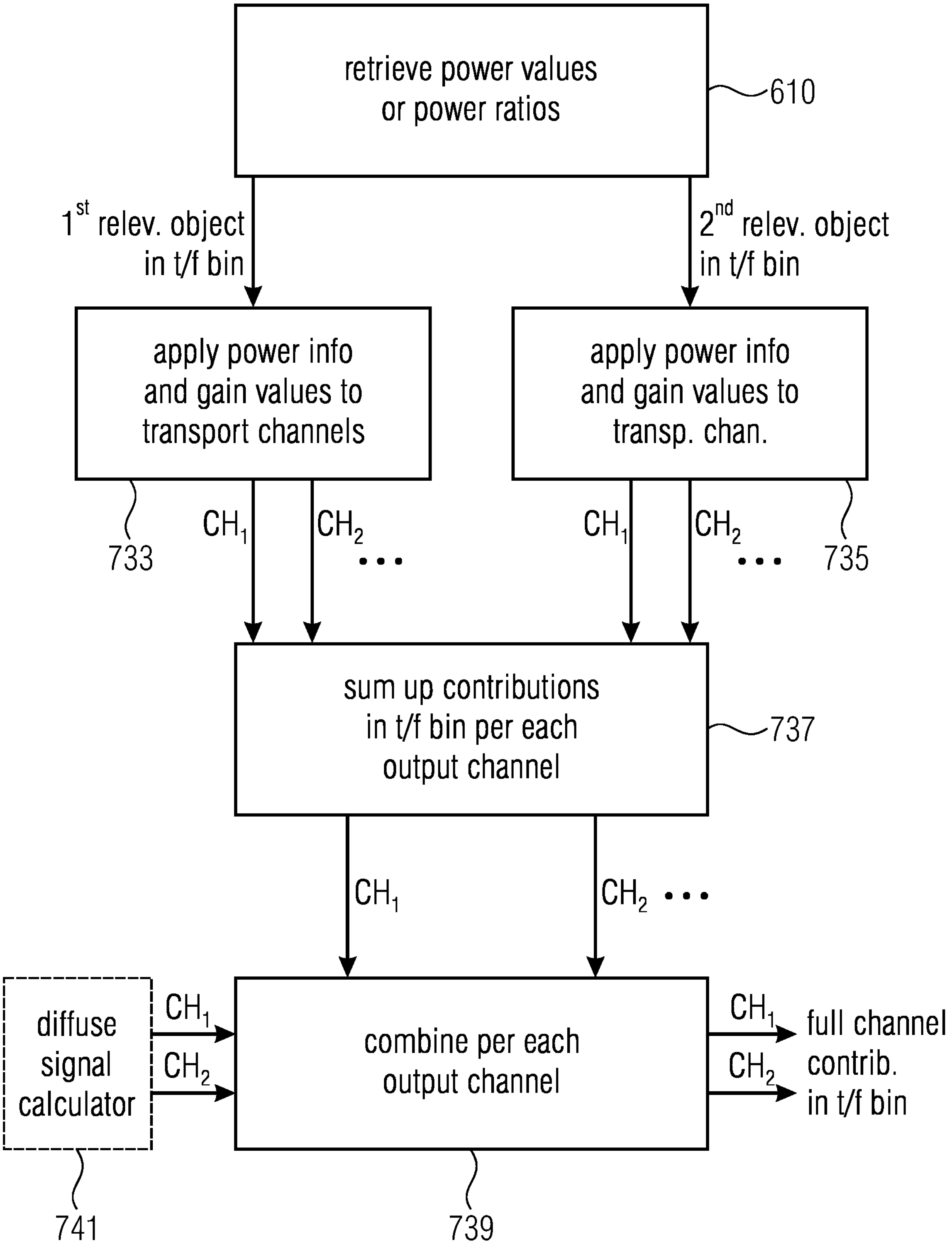
FIG. 10*b* illustrates an advantageous implementation of the output channel calculation of FIG. 10*a* in accordance with an embodiment having a summing up of contributions per each output channels.
Figure 10C:
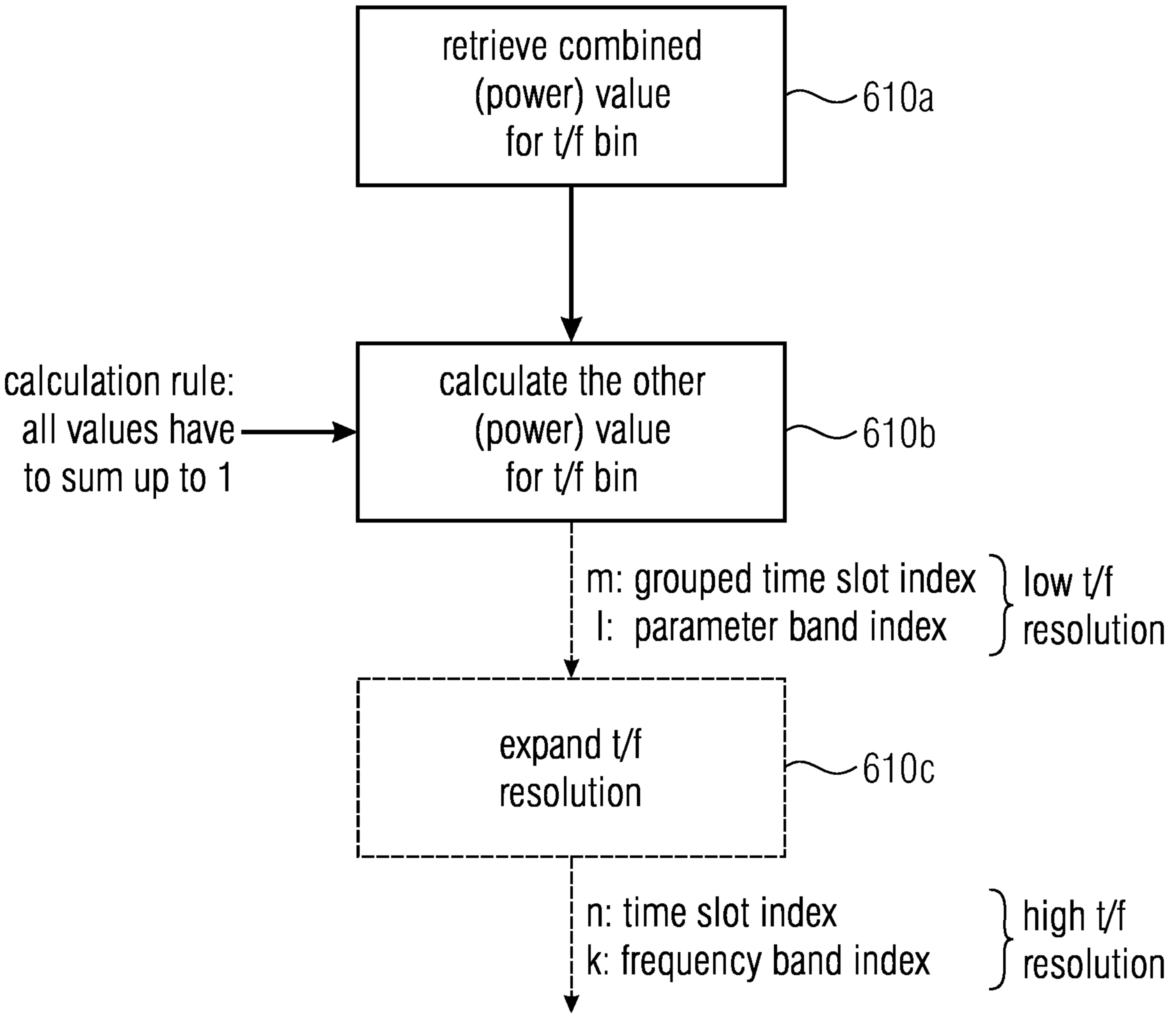
FIG. 10*c* illustrates an advantageous way of determining power values in accordance with the first aspect for a plurality of relevant objects.

In this context, FIG. 8*a* illustrates a time/frequency representation as generated by the filterbank 102 of FIG. 2 or FIG. 3 when this filterbank is implemented as the CLDFB (Complex Low Delay Filterbank) discussed before. For a frame, for which a direction information is given as discussed before with respect to FIGS. 8*b* and 8*c*, the filterbank generates 16 time slots going from 0 to 15 and 60 frequency bands going from 0 to 59 in FIG. 8*a*. Thus, one time slot and one frequency band represents a time/frequency tile 802 or 804. Nevertheless, in order to reduce the bitrate for the side information, it is of advantage to convert the high resolution representation into a low resolution representation illustrated in FIG. 8*b*, where only a single time bin exists and where the 60 frequency bands are converted into 11 parameter bands as illustrated at 812 in FIG. 8*b*. Thus, as illustrated in FIG. 10*c*, a high resolution representation is indicated by a time slot index n and a frequency band index k, and a low resolution representation is given by a grouped time slot index m and a parameter band index I. Nevertheless, in the context of the specification, a time/frequency bin may comprise a high resolution time/frequency tile 802, 804 of FIG. 8*a* or a low resolution time/frequency unit identified by a grouped time slot index and a parameter band index at the input of block 731*c* in FIG. 10*c*.

In the FIG. 6*a* embodiment, the audio renderer 700 is configured to calculate, for each one of the one or more frequency bins, a contribution from the one or more transport channels in accordance with a first direction information associated with a first one of the at least two relevant audio objects and in accordance with a second direction information associated with a second one of the at least two relevant audio objects. In the embodiment illustrated in FIG. 8*b*, block 814 has an object index for each relevant object in a parameter band, i.e., has two or more object indices so that there exist two contributions per time frequency bin.

As will be outlined later on with respect to FIG. 10*a*, the calculation of the contributions can be done indirectly via the mixing matrix where gain values for each relevant object are determined and used for calculating the mixing matrix. Alternatively, as illustrated in FIG. 10*b*, the contributions can be explicitly calculated again using the gain values and then the explicitly calculated contributions are summed up per each output channel in a certain time/frequency bin. Thus, irrespective of whether the contributions are explicitly calculated or implicitly calculated, the audio renderer nevertheless renders the one or more transport channels into the number of audio channels using the direction information so that, for each one of the one or more frequency bins, the contribution from the one or more transport channels in accordance with a first direction information associated with a first one of the at least two relevant audio objects and in accordance with a second direction information associated with a second one of the at least two relevant audio objects is included in the number of audio channels.

Figure 6B:
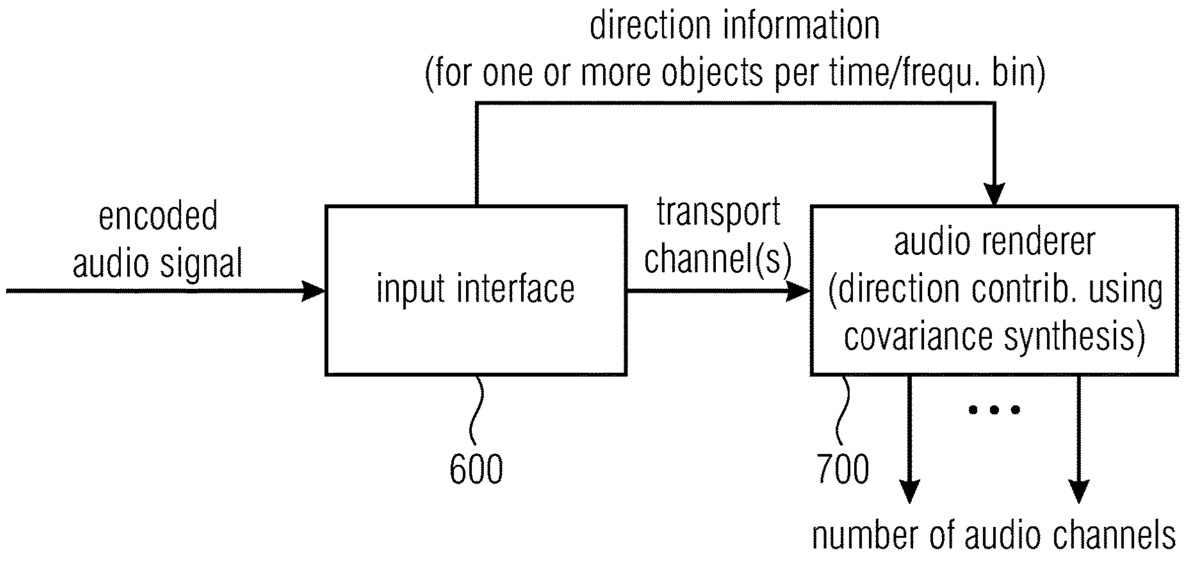
FIG. 6*b* is a decoder in accordance with the second aspect.

FIG. 6*b* illustrates a decoder for decoding an encoded audio signal comprising one or more transport channels and direction information for a plurality of audio objects and, for one or more frequency bins of a time frame, parameter data for an audio object in accordance with the second aspect. Again, the decoder comprises an input interface 600 that receives the encoded audio signal and the decoder comprises an audio renderer 700 for rendering the one or more transport channels into a number of audio channels using the direction information. Particularly, the audio renderer is configured to calculate a direct response information from the one or more audio objects per each frequency bin of the plurality of frequency bins and the direction information associated with the relevant one or more audio objects in the frequency bins. This direct response information advantageously comprises gain values either used for a covariance synthesis or an advanced covariance synthesis or used for an explicit calculation of contributions from one or more transport channels.

Advantageously, the audio renderer is configured to calculate a covariance synthesis information using the direct response information for one or more relevant audio objects in a time/frequency band and using an information on the number of audio channels. Furthermore, the covariance synthesis information which is, advantageously, the mixing matrix, is applied to the one or more transport channels to obtain the number of audio channels. In a further implementation, the direct response information is a direct response vector for each one or more audio object and the covariance synthesis information is a covariance synthesis matrix, and the audio renderer is configured to perform a matrix operation per frequency bin in applying the covariance synthesis information.

Furthermore, the audio renderer 700 is configured to derive, in the calculation of the direct response information, a direct response vector for the one or more audio objects and to calculate, for the one or more audio objects, a covariance matrix from each direct response vector. Furthermore, in the calculation of the covariance synthesis information, a target covariance matrix is calculated. Instead of the target covariance matrix, however, the relevant information for the target covariance matrix, i.e., the direct response matrix or vector for the one or more most dominant objects and a diagonal matrix of the direct powers indicated as E as determined by the application of the power ratios can be used.

Thus, the target covariance information does not necessarily have to be an explicit target covariance matrix, but is derived from the covariance matrix of the one audio object or the covariant matrices from more audio objects in a time/frequency bin, from a power information on the respective one or more audio objects in the time/frequency bin and the power information derived from the one or more transport channels for the one or more time/frequency bins.

The bitstream representation is read by the decoder and the encoded transport channels and the encoded parametric side information contained therein are made available for further processing. The parametric side information comprises:

- Direction information as quantized azimuth and elevation values (for each frame)
- Object indices denoting the subset of relevant objects (for each parameter band)
- Quantized power ratios relating the relevant objects to each other (for each parameter band)

Figure 4:
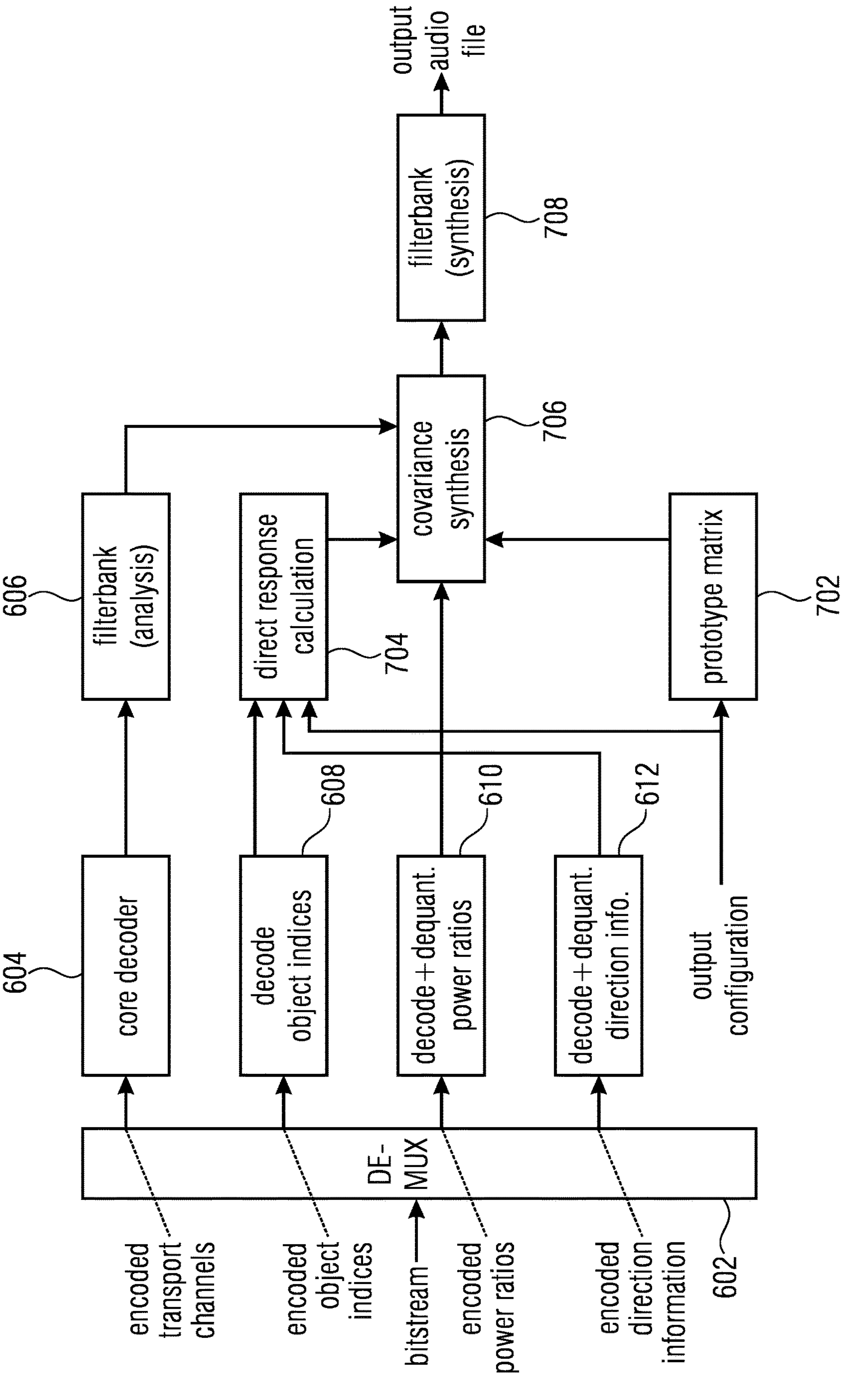
FIG. 4 is an advantageous implementation of a decoder in accordance with the first and second aspect.

All processing is done in a frame-wise manner, where each frame comprises one or multiple subframes. A frame may consist of four subframes, for example, in which case one subframe would have a duration of 5 milliseconds. FIG. 4 shows a simplified overview of the decoder.

FIG. 4 illustrates an audio decoder implementing the first and the second aspect. The input interface 600 illustrated in FIG. 6*a* and FIG. 6*b* comprises a demultiplexer 602, a core decoder 604, a decoder for decoding the object indices 608, a decoder for decoding and dequantizing the power ratio 612, and a decoder for decoding and dequantizing the direction information indicated at 612. Furthermore, the input interface comprises a filterbank 606 for providing the transport channels in the time/frequency representation.

The audio renderer 700 comprises a direct response calculator 704, a prototype matrix provider 702 that is controlled by an output configuration received by a user interface, for example, a covariance synthesis block 706 and a synthesis filterbank 708 in order to finally provide an output audio file comprising the number of audio channels in the channel output format.

Thus, item 602, 604, 606, 608, 610, 612 are advantageously included in the input interface of FIG. 6*a* and FIG. 6*b*, and items 702, 704, 706, 708 of FIG. 4 are part of the audio renderer of FIG. 6*a* or FIG. 6*b* indicated at reference number 700.

The encoded parametric side information is decoded and the quantized power ratio values, the quantized azimuth and elevation values (direction information), and the object indices are reobtained. The one power ratio value not transmitted is obtained by exploiting the fact that all power ratio values sum up to 1. Their resolution (l, m) corresponds to the time/frequency tile grouping employed at the encoder side. During further processing steps, where a finer time/frequency resolution (k,n) is used, the parameters of the parameter band are valid for all time/frequency tiles contained in this parameter band, corresponding to an expansion such that (l,m)→(k,n).

The encoded transport channels are decoded by the core decoder. Using a filterbank (matching the one employed in the encoder), each frame of the thus decoded audio signal is transformed into a time/frequency representation, the resolution of which is typically finer than (but at least equal to) the resolution used for the parametric side information.

Output Signal Rendering/Synthesis

The following description applies to one frame of the audio signal; $^T$ denotes the transpose operator:

Using the decoded transport channels $x=x(k,n)=[X_1(k,n), X_2(k,n)]^T$, i.e., the audio signal in time-frequency representation (in this case comprising two transport channels), and the parametric side information, the mixing matrix M for each subframe (or frame to reduce computational complexity) is derived to synthesize the time-frequency output signal $y=y(k,n)=[Y_1(k,n),Y_2(k,n),Y_3(k,n), \ldots]^T$ comprising a number of output channels (e.g. 5.1, 7.1, 7.1+4 etc.):

- For all (input) objects, using the transmitted object directions, so-called direct response values are determined that describe the panning gains to be employed to the output channels. These direct response values are specific to the target layout, i.e., the number and location of the loudspeakers (provided as part of the output configuration). Examples of panning methods include vector-base amplitude panning (VBAP) [Pulkki1997] and edge-fading amplitude panning (EFAP) [Borβ2014]. Each object has a vector of direct response values $dr_i$ (containing as many elements as there are loudspeakers) associated with it. These vectors are computed once per frame. Note: If the object position corresponds to a loudspeaker position, the vector contains the value 1 for this loudspeaker; all other values are 0. If the object is located in between two (or three) loudspeakers, the corresponding number of non-zero vector elements is two (or three).
- The actual synthesis step (in this embodiment covariance synthesis [Vilkamo2013]) comprises the following substeps (cf. FIG. 5 for a visualization):
  - For each parameter band, the object indices, describing the subset of dominant objects among the input objects within the time/frequency tiles grouped into this parameter band, are used to extract the subset of vectors $dr_i$ needed for the further processing. As there are, e.g., only 2 relevant objects considered, the 2 vectors $dr_i$ associated with these 2 relevant objects are needed.
  - From the direct response values $dr_i$, a covariance matrix $C_i$ of dimension output channels-by-output channels is then calculated for each relevant object:

$$C_i=dr_i*dr_i^T$$

- For each time/frequency tile (within the parameter band), the audio signal power P(k,n) is determined. In the case of two transport channels, the signal power of the first channel is added to that of the second. To this signal power, each of the power ratio values is multiplied, thus yielding one direct power value for each relevant/dominant object i:

$$DP_i(k,n)=PR_i(k,n)*P(k,n)$$

For each frequency band k, the final target covariance matrix Cy of size output channels-by-output channels is obtained by summing over all slots n within the (sub)frame as well as summing over all relevant objects:

$$C_Y = \sum_n \sum_i DP_i(k, n) C_i$$

Figure 5:
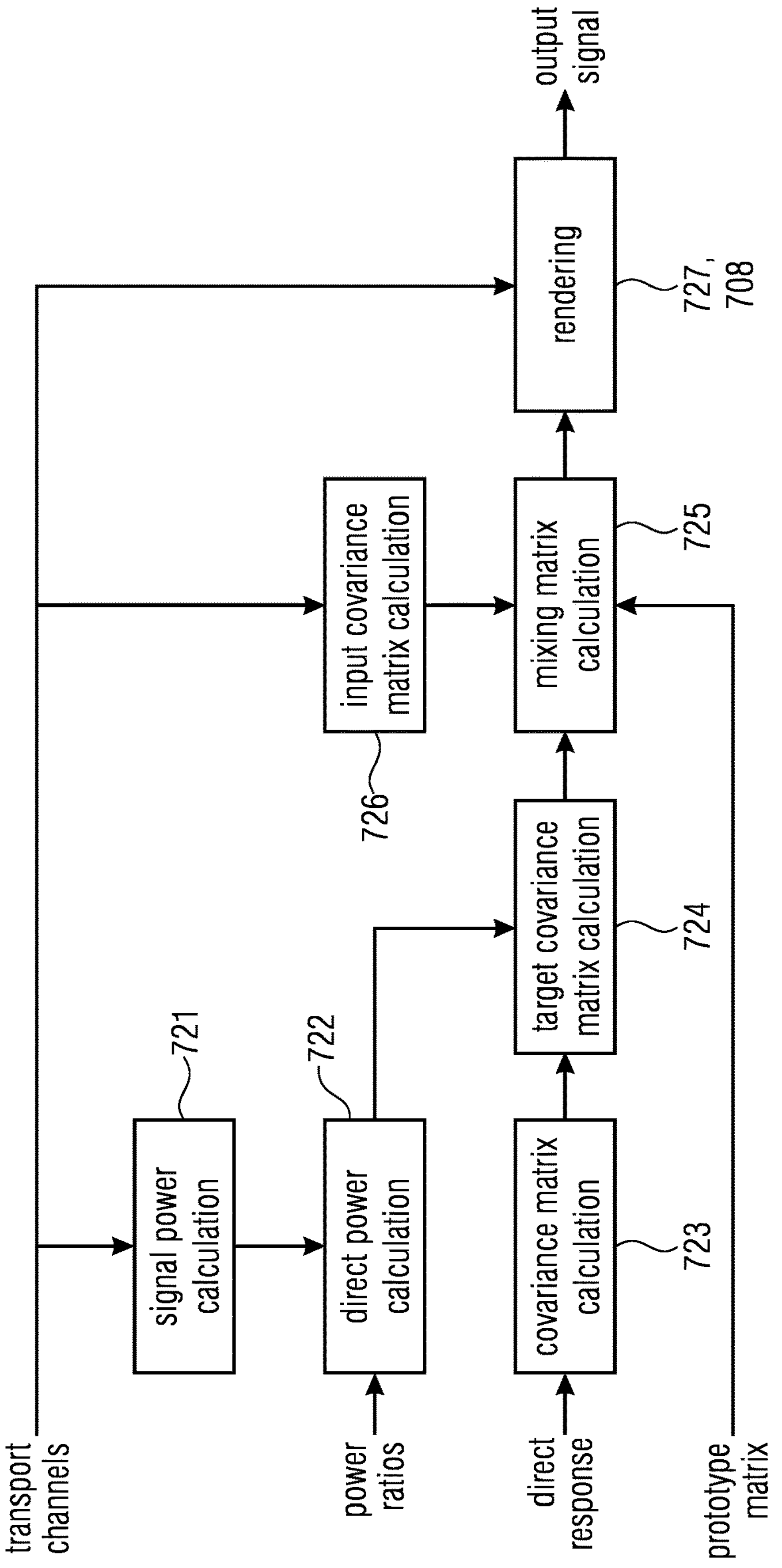
FIG. 5 is an advantageous implementation of the covariance synthesis processing of FIG. 4.

FIG. 5 illustrates a detailed overview over the covariance synthesis step performed in block 706 of FIG. 4. Particularly, the FIG. 5 embodiment comprises a signal power calculation block 721, a direct power calculation block 722, a covariance matrix calculation block 73, a target covariance matrix calculation block 724, an input covariance matrix calculation block 726, a mixing matrix calculation block 725 and a rendering block 727 that, with respect to FIG. 5, additionally comprises the filterbank block 708 of FIG. 4 so that the output signal of block 727 advantageously corresponds to a time domain output signal. However, when block 708 is not included in the rendering block of FIG. 5, then the result is a spectral domain representation of the corresponding audio channels.

(The following steps are part of the state of the art [Vilkamo2013] and added for clarification.)

For each (sub)frame and for each frequency band, an input covariance matrix $C_x = xx^T$ of size transport channels-by-transport channels is calculated from the decoded audio signal. Optionally, only the entries of the main diagonal may be used, in which case other non-zero entries are set to zero.

A prototype matrix of size output channels-by-transport channels is defined that describes the mapping of the transport channel(s) to the output channels (provided as part of the output configuration), the number of which is given by the target output format (e.g., the target loudspeaker layout). This prototype matrix may be static or change on a frame-by-frame basis. Example: If only a single transport channel was transmitted, this transport channel is mapped to each of the output channels. If two transport channels were transmitted, the left (first) channel is mapped to all output channels that are located at positions within (+0°, +180°), i.e., the "left" channels. The right (second) channel is correspondingly mapped to all output channels located at positions within (−0°, −180°), i.e., the "right" channels. (Note: 0° describes the position in front of the listener, positive angles describe positions to the left of the listener, and negative angles describe positions to the right of the listener. If a different convention is employed, the signs of the angles need to be adapted accordingly.)

Using the input covariance matrix $C_x$, the target covariance matrix $C_y$, and the prototype matrix, a mixing matrix is calculated [Vilkamo2013] for each (sub) frame and each frequency band, resulting in, e.g., 60 mixing matrices per (sub)frame.

The mixing matrices are (for example linearly) interpolated between (sub)frames, corresponding to a temporal smoothing.

Finally, the output channels y are synthesized band by band by multiplying the final set of mixing matrices M, each of dimension output channels-by-transport channels, to the corresponding band of the time/frequency representation of the decoded transport channels x:

$$y = Mx$$

rNote that we do not make use of a residual signal as described in [Vilkamo2013].

*r*

The output signal y is transformed back into a time-domain representation y(t) using a filterbank.

Optimized Covariance Synthesis

Due to how the input covariance matrix $C_x$ and the target covariance matrix $C_y$ are calculated for the present embodiment, certain optimizations to the optimal mixing matrix calculation using the covariance synthesis from [Vilkamo2013] can be achieved that result in a significant reduction to the computational complexity of the mixing matrix calculation. Please note that, in this section, the Hadamard operator ∘ denotes an element-wise operation on a matrix, i.e., instead of following the rules of, e.g., matrix multiplication, the respective operation is conducted element by element. This operator states that the corresponding operation is not conducted on the entire matrix, but separately on each element. A multiplication of matrices A and B would for example not correspond to a matrix multiplication AB=C, but to an element-wise operation a_ij*b_ij=c_ij.

SVD(.) denotes a singular value decomposition. The algorithm from [Vilkamo2013], presented there as Matlab function (Listing 1) is as follows (known technology):

input: A matrix $C_x$ of size m×m, containing the covariance of the input signal input: A matrix $C_y$ of size n×n, containing the target covariance of the output signal input: A matrix Q of size n×m, the prototype matrix input: A scalar α, the regularization factor for $S_x$ ([Vilkamo2013] proposes α=0.2)

input: A scalar β, the regularization factor for $G_{\hat{y}}$([Vilkamo2013] proposes β=0.001)

input: A Boolean a, denoting if an energy compensation should be performed instead of calculating the residual covariance $C_r$ output: A matrix M of size n×m, the optimal mixing matrix output: A matrix C, of size n×n, containing the residual covariance % Decomposition of $C_y$ ([Vilkamo2013]), Equation (3))

1 $U_{C_y}, S_{C_y}, V_{C_y} \leftarrow SVD(C_y)$ % SVD of a n×n matrix

2 $K_y \leftarrow U_{C_y}, S_{C_y}^{\circ 1/2}$

% Decomposition of C, ([Vilkamo2013], Equation (3))

3 $U_{C_x}, S_{C_x}, V_{C_x} \leftarrow SVD(C_x)$ % SVD of a m×m matrix

4 $K_x \leftarrow U_{C_x} S_{C_x}^{\circ 1/2}$

% SVD of $K_x$, ([Vilkamo2013], Section 3.2, $V_x$=I)

5 $U_x \leftarrow U_{C_x}$

6 $S_x \leftarrow S_{C_x}^{\circ 1/2}$

% Regularization of $S_x$ ([Vilkamo2013], Section 3.2, $V_x$=I)

7 $s_{x_{max}} \leftarrow \max(\mathrm{diag}(S_x))$

8 $s'_{x_{i,i}} \leftarrow \max(s_{x_{i,i}}, \alpha s_{x_{max}})$, i=1, . . . , m % Formulate regularized $K'^{-1}_x$([Vilkamo2013], Section 3.2, $V_x$=I)

9

$$K_x'^{-1} \leftarrow S_x'^{\circ -1} U_x^H$$

% Formulate normalization matrix $G_{\hat{y}}$
$C_{\hat{y}} \leftarrow QC_xQ^H$ % [Vilkamo2013], Eq.
10 (5),(2)
% The following regularization step is only found in Listing 1 of
[Vilkamo2013] but never explained in the text
11 $c_{\hat{y}_{max}} \leftarrow \max(\mathrm{diag}(C_{\hat{y}}))$
12 $c'_{\hat{y}_{i,i}} \leftarrow \max(c_{\hat{y}_{i,i}}, \beta c_{\hat{y}_{max}})$, i=1, . . . , n
13

$$g_{\hat{y}_{i,i}} \leftarrow \sqrt{\frac{c_{y_{i,i}}}{c'_{\hat{y}_{i,i}}}},\ i = 1, \ldots, n \ \text{\% [Vilkamo2013]}, \qquad \text{Eq. (7)}$$

% Formulate optimal P ([Vilkamo2013], Section 3.1)
14 U, S, V $\leftarrow$ SVD($K_x^H Q^H G_{\hat{y}}^H K_y$) % SVD of a m×n matrix
% [Vilkamo2013], Eq. (3), $\Lambda$ is the extended identity matrix from
[Vilkamo2013], Section 3.3
15 $P \leftarrow V\Lambda U^H$
% Formulate optimal $M_{opt}$
16

$$M_{opt} \leftarrow K_y P K_x'^{-1} \ \text{\% [Vilkamo2013]}, \qquad \text{Eq. (11)}$$

% Formulate residual covariance matrix $C_r$
17 $C_{\hat{y}} \leftarrow M_{opt} C_x M_{opt}^H$
18 $C_r \leftarrow C_y - C_{\hat{y}}$ % [Vilkamo2013], Eq. (15)
% Energy compensation
19 if $\alpha$ then
20

$$g_{i,i} \leftarrow \sqrt{\frac{c_{y_{i,i}}}{c_{\hat{y}_{i,i}}}},\ i = 1, \ldots, n \ \text{\% [Vilkamo2013]}, \qquad \text{Eq. (17)}$$

21 $M \leftarrow M_{opt}G$ % [Vilkamo2013], Eq. (17)
22 else
23 $M \leftarrow M_{opt}$ As stated in the previous section, only the main diagonal elements of $C_x$ are optionally used and all other entries are set to zero. In this case $C_x$ is a diagonal matrix and a valid decomposition satisfying Eq. (3) of [Vilkamo2013] is $$K_x = C_x^{\circ 1/2}$$

and the SVD from line 3 of the known algorithm is no longer necessary.

Considering the formulas for generating the target covariance from the direct responses $dr_i$ and the direct powers (or direct energies) from the previous section $$C_i = dr_i * dr_i^T$$

$$DP_i(k, n) = PR_i(k, n) * P(k, n) C_Y = \sum_n \sum_i DP_i(k, n) C_i,$$

the last formula can be rearranged and written as $$C_Y = \sum_i C_i \sum_n DP_i(k, n).$$

If we now define $$E_i = \sum_n DP_i(k, n)$$

and thus obtain $$C_Y = \sum_i C_i E_i,$$

it can be easily seen that if we arrange the direct responses in a direct response matrix $R=[dr_1 \ldots dr_k]$ for the k most dominant objects and create a diagonal matrix of the direct powers as E, with $e_{i,j}=E_i$, $C_y$ can also be expressed as $$C_y = RER^H$$

and a valid decomposition of $C_y$ satisfying Eq. (3) of [Vilkamo2013] is given by:

$$C_y = RE^{\circ 1/2}$$

Consequently, the SVD from line 1 of the prior-art algorithm is no longer necessary.

This leads to an optimized algorithm for the covariance synthesis within the present embodiment, which also takes into account that we always use the energy compensation option and therefore do not require the residual target covariance $C_r$:

input: A diagonal matrix C, of size m×m, containing the covariance of the input signal with m channels
input: A matrix R of size n×k, containing the direct responses for the k dominant objects
input: A diagonal matrix E containing the target powers for the dominant objects
input: A matrix Q of size n×m, the prototype matrix
input: A scalar $\alpha$, the regularization factor for $S_x$([Vilkamo2013] proposes $\alpha$=0.2)
input: A scalar $\beta$, the regularization factor for $G_{\hat{y}}$([Vilkamo2013] proposes $\beta$=0.001)
output: A matrix M of size n×m, the optimal mixing matrix % Decomposition of $C_Y$ (inventive step)
1 $K_y \leftarrow RE^{\circ 1/2}$
% Decomposition of $C_x$ (inventive step)
2 $K_x \leftarrow C_x^{\circ 1/2}$
% Regularization of $S_x$, (inventive step, $K_x$ is a diagonal matrix, so this step can also be simplified)
3 $S_x \leftarrow K_x$
4 $S_{x_{max}} \leftarrow \max(\mathrm{diag}(S_x))$
5 $s'_{x_{i,i}} \leftarrow \max(s_{x_{i,i}}, \alpha s_{x_{max}})$i=1, . . . , m
% Formulate regularized $$K_x'^{-1}$$

(inventive step, also simplified)
6

$$K_x'^{-1} \leftarrow S_x'^{\circ -1}$$

% Formulate normalization matrix $G_{\hat{y}}$ $C_{\hat{y}} \leftarrow Q C_x Q^H$ % [Vilkamo2013], Eq. (5),(2)

$C_Y = RER^H$

% The following regularization step is only found in Listing 1 of [Vilkamo2013] but never explained in the text $c_{\hat{y}_{max}} \leftarrow \max(\mathrm{diag}(C_{\hat{y}}))$ $c'_{\hat{y}_{i,i}} \leftarrow \max(c_{\hat{y}_{i,i}}, \beta c_{\hat{y}_{max}})$, i=1, . . . , n $$g_{\hat{y}_{i,i}} \leftarrow \sqrt{\frac{c_{y_{i,i}}}{c'_{\hat{y}_{i,i}}}}, \; i = 1, \ldots, n \; \% \; [Vilkamo2013], \tag{7}$$

% Formulate optimal P ([Vilkamo2013], Section 3.1)

$$U, S, V \leftarrow SVD\left(K_x^H Q^H G_{\hat{y}}^H K_y\right) \; \% \, SVD \text{ of a } m \times k \text{ matrix}$$

% no Λ is necessary here (inventive step)

$P \leftarrow VU^H$

% Formulate optimal $M_{opt}$ $$M_{opt} \leftarrow K_y P K_x'^{-1} \; \% \; [Vilkamo2013], \tag{11}$$

% Energy compensation $C_{\hat{y}} \leftarrow M_{opt} C_x M_{opt}^H$ $$g_{i,i} \leftarrow \sqrt{\frac{c_{y_{i,i}}}{c_{\hat{y}_{i,i}}}}, \; i = 1, \ldots, n \; \% \; [Vilkamo2013], \tag{17}$$

$M \leftarrow M_{opt} G$ % [Vilkamo2013], Eq. (17)

A careful comparison between the prior-art algorithm and the proposed algorithm shows that the former needs three SVDs of matrices with sizes m×m, n×n, and m×n, respectively, where m is the number of downmix channels and n is the number of output channels the objects are rendered to.

The proposed algorithm only needs one SVD of a matrix with size m×k, where k is the number of dominant objects. Furthermore, since k is typically much smaller than n, this matrix is smaller than the corresponding matrix from the prior-art algorithm.

The complexity of standard SVD implementations is roughly $0(c_1 m^2 n + c_2 n^3)$ for a m×n matrix [Golub2013], where $c_1$ and $c_2$ are constants that depend on the algorithm used. Therefore, a significant decrease of the computational complexity of the proposed algorithm compared to the prior-art algorithm is achieved.

Subsequently, advantageous embodiments relating to the encoder-side of the first aspect are discussed with respect to FIGS. 7*a*, 7*b*. Furthermore, advantageous implementations of the encoder-side implementation of the second aspect are discussed with respect to FIG. 9*a* to 9*d*.

Figure 7A:
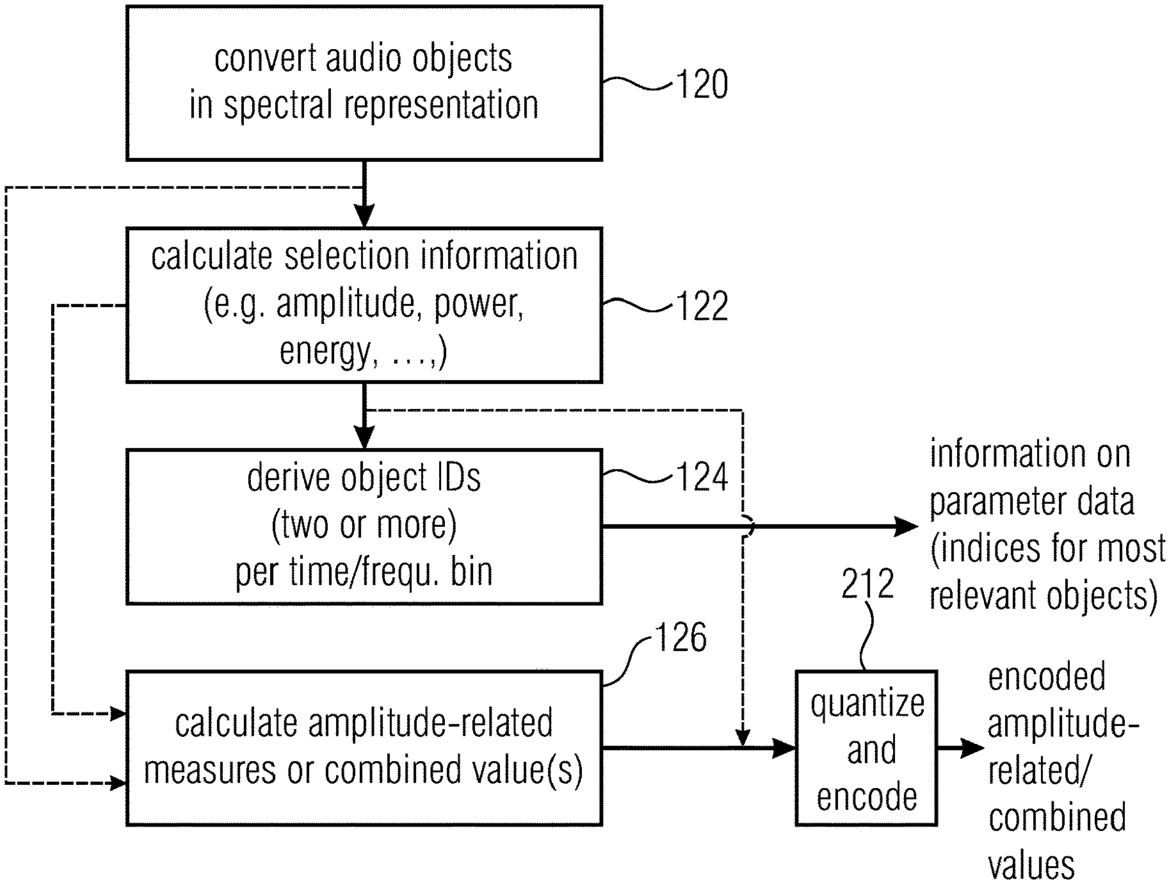
FIG. 7*a* is a flowchart for illustrating the determination of the parameter information in accordance with the first aspect.

FIG. 7*a* illustrates an advantageous implementation of the object parameter calculator 100 of FIG. 1*a*. In a block 120, the audio objects are converted into a spectral representation. This is implemented by the filterbank 102 of FIG. 2 or FIG. 3. Then, in block 122, the selection information is calculated as illustrated, for example, in block 104 of FIG. 2 or FIG. 3. To this end, an amplitude-related measure can be used such as the amplitude itself, the power, the energy or any other amplitude-related measure obtained by raising the amplitude to a power, where the power is different from 1. The result of block 122 is a set of selection information for each object in a corresponding time/frequency bin. Then, in block 124, the object IDs per time/frequency bin are derived. In the first aspect, two or more object IDs per time/frequency bin are derived. In accordance with the second aspect, the number of object IDs per time/frequency bin can even be only a single object ID so that the most important or strongest or most relevant object is identified in block 124 among the information provided by block 122. Block 124 outputs the information on the parameter data and includes the single or several indices for the most relevant one or more objects.

In case of having two or more relevant objects per time/frequency bin, the functionality of block 126 is useful for calculating amplitude-related measures characterizing the objects in the time/frequency bin. This amplitude-related measures can be the same as have been calculated for the selection information in block 122 or, advantageously, combined values are calculated using the information already calculated by block 102 as indicated by the broken line between block 122 and block 126, and the amplitude-related measures or one or more combined values are then calculated in block 126 and forwarded to the quantizer and encoder block 212 in order to have, as an additional parametric side information the encoded amplitude-related or encoded combined values in the side information. In the embodiment of FIG. 2 or FIG. 3, these are the "encoded power ratios" that are included in the bitstream together with the "encoded object indices". In case of having only a single object ID per frequency bin, the power ratio calculation and quantization encoding is not necessary and the index for the most relevant object in a time frequency bin is sufficient for performing a decoder-side rendering.

Figure 7B:
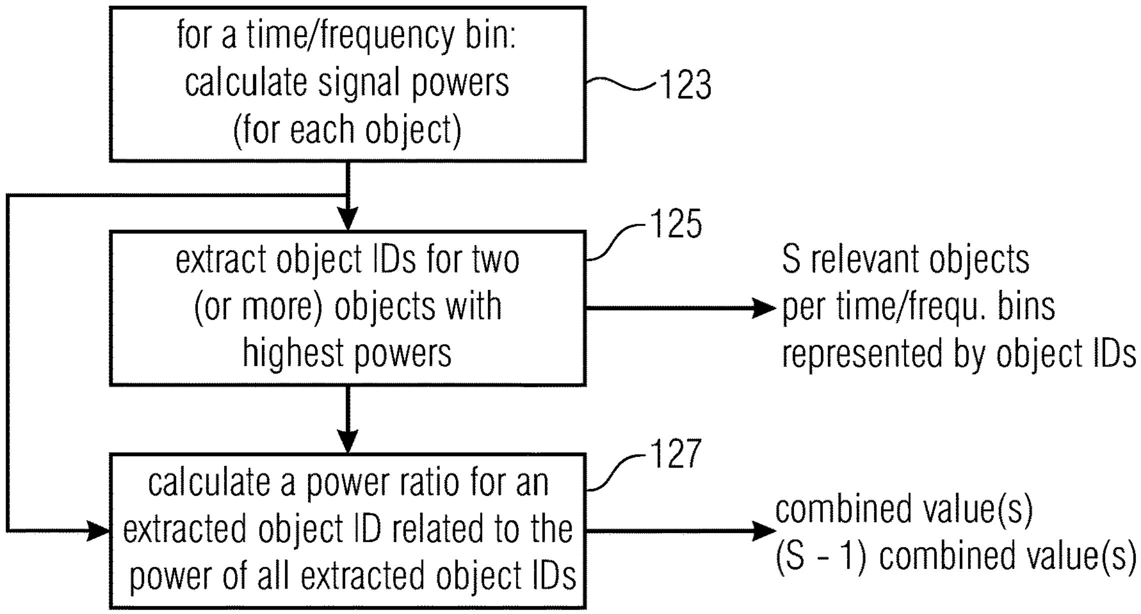
FIG. 7*b* is an advantageous implementation of a further determination of the parametric data.

FIG. 7*b* illustrates an advantageous implementation of the calculation of a selection information 102 of FIG. 7*b*. As illustrated in block 123, the signal powers are calculated for each object and each time/frequency bin as the selection information. Then, in block 125 illustrating an advantageous implementation of block 124 of FIG. 7*a*, the object IDs for a single or advantageously two or more objects with the highest powers is or are extracted and output. Furthermore, in case of two or more relevant objects, a power ratio is calculated as indicated in block 127 as an advantageous implementation of block 126, where the power ratio is calculated for an extracted object ID related to the power of all extracted objects with corresponding object IDs found by block 125. This procedure is advantageous, since only a number of combined values has to be transmitted which is one less than the number of objects for a time/frequency bin, since there exists the rule known to a decoder in this embodiment stating that the power ratios for all objects have to sum up to unity. Advantageously, the functionalities of blocks 120, 122, 124, 126 of FIG. 7*a* and/or 123, 125, 127 of FIG. 7*b* are implemented by the object parameter calculator 100 of FIG. 1*a*, and the functionality of block 212 of FIG. 7*a* is implemented by the output interface 200 of FIG. 1*a*.

Figure 12A:
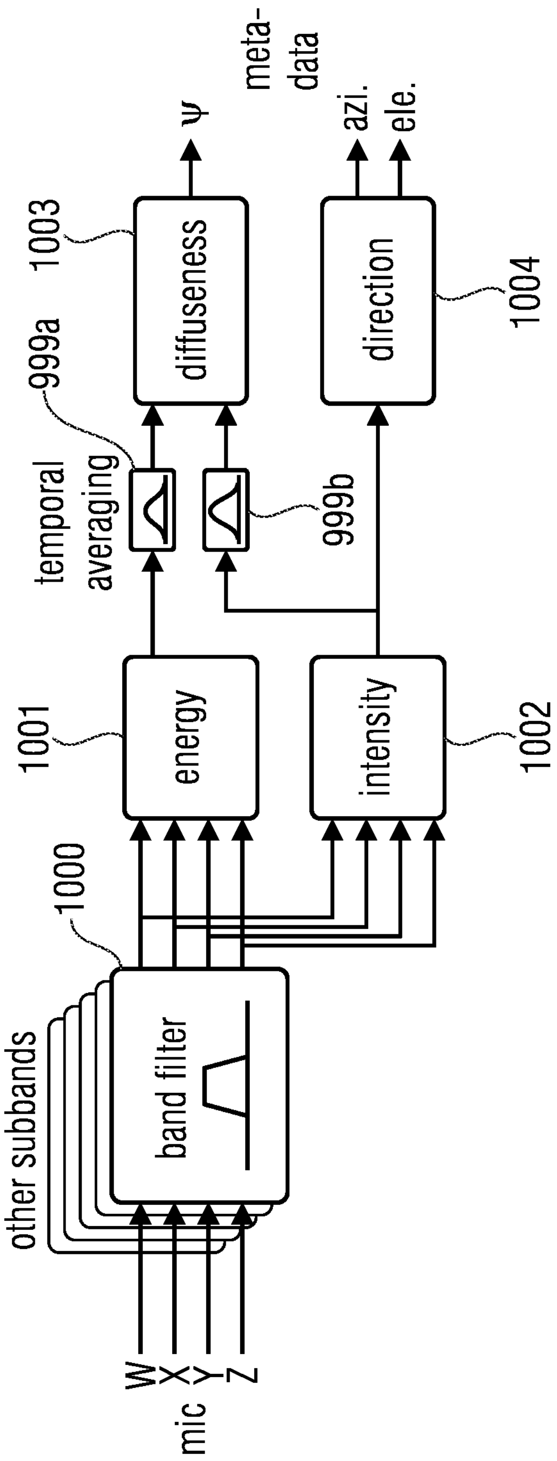
Fig. 12a (PRIOR ART)
FIG. 12*a* illustrates a known DirAC encoder.
Figure 12B:
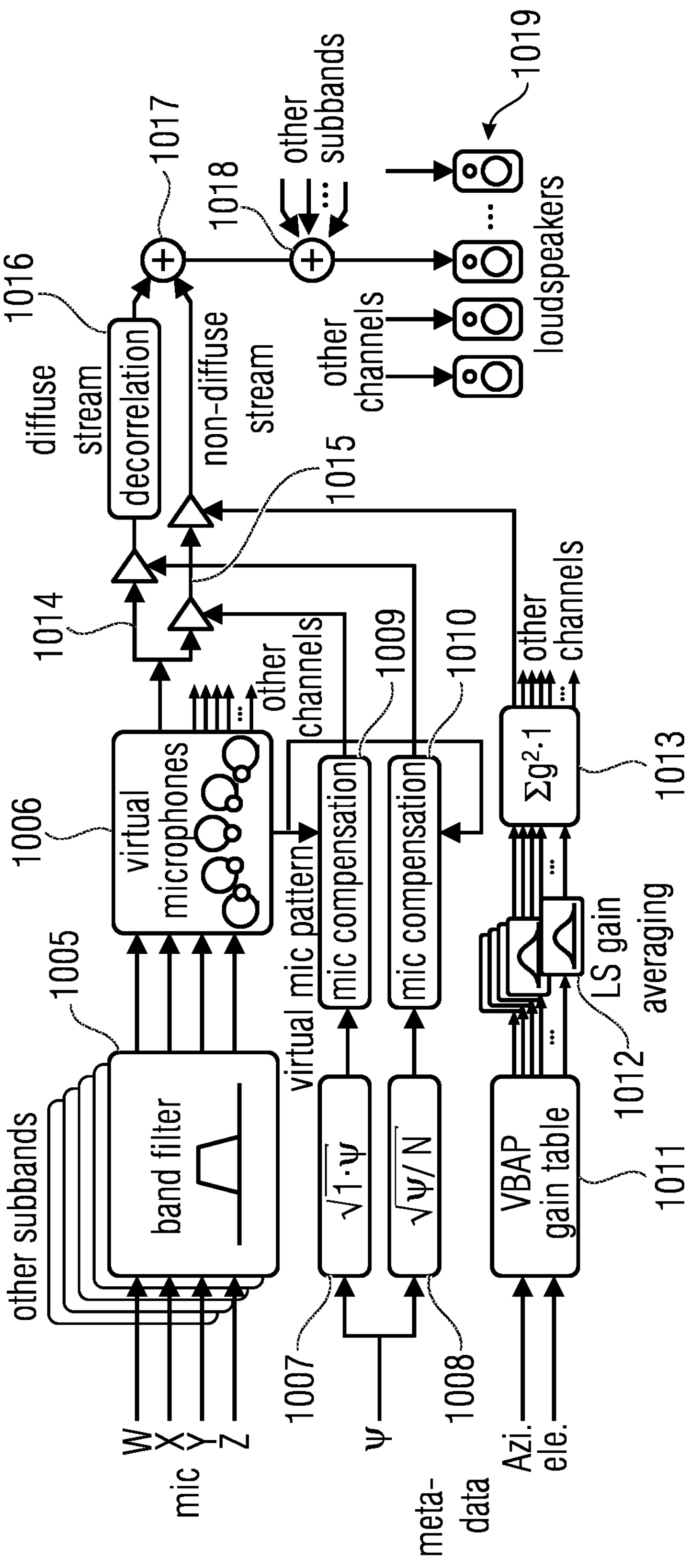
Fig. 12b (PRIOR ART)
FIG. 12*b* illustrates a known DirAC decoder.

Subsequently, the apparatus for encoding in accordance with the second aspect illustrated in FIG. 1*b* is explained in more detail with respect to several embodiments. In step 110*a*, direction information is extracted either from input signals as, for example, illustrated with respect to FIG. 12_a_ or by reading or parsing metadata information included in a metadata portion or metadata file. In step 110_b_, the direction information per frame and audio object is quantized and a quantization index per object per frame is forwarded to an encoder or an output interface such as the output interface 200 of FIG. 1_b_. In step 110_c_, the direction quantization index is dequantized in order to have a dequantized value that can also be directly output by block 110_b_ in certain implementations. Then, based on the dequantized direction index, block 422 calculates weights for each transport channel and for each object based on a certain virtual microphone setting. This virtual microphone setting can comprise two virtual microphone signals arranged at the same position and having different orientations or can be a setting where there are two different positions with respect to a reference position or orientation such as a virtual listener position or orientation. A setting with two virtual microphone signals will result in weights for two transport channels for each object.

In case of generating three transport channels, the virtual microphone setting can be considered to comprise three virtual microphone signals from microphones arranged at the same position and having different orientations or at three different positions with respect to a reference position or orientation where this reference position of orientation can be a virtual listener positon or orientation.

Alternatively, four transport channels can be generated based on a virtual microphone setting generating four virtual microphone signals from microphones arranged at the same position and having different orientations or from four virtual microphone signals arranged at four different positions with respect to a reference position or a reference orientation where the reference position or orientation can be virtual listener position or a virtual listener orientation.

Furthermore, for the purpose of calculating the weights for each object and for each transport channel $w_L$ and $w_R$ for the example of two channels, the virtual microphone signals are signals derived from virtual first order microphones are virtual cardioid microphones or virtual figure of eight microphones or depo microphones are bidirectional microphones or derived from virtual directional microphones or from virtual subcardioid microphones or from virtual unidirectional microphones or from virtual hypercardioid microphones or from virtual omnidirectional microphones.

In this context, it is to be noted that for the purpose of calculating the weights, any placement of actual microphones is not required. Instead, the rules for calculating the weights change depending on the virtual microphone setting, i.e., the placement of the virtual microphones and the characteristic of the virtual microphones.

In block 404 of FIG. 9_a_, the weights are applied to the objects so that, for each object, a contribution of the object for a certain transport channel is obtained in case of a weight being different from 0. Therefore, block 404 receives, as an input, the object signals. Then, in block 406, the contributions are summed up per each transport channel so that, for example, the contributions from the objects for the first transport channel are added together and the contributions of the objects for the second transport channels are added together, and so on. As illustrated in block 406, then, the output of block 406 are the transport channels for example, in the time domain.

Advantageously, the object signals input into block 404 are time domain object signals having a full band information and the application in block 404 and the summing up in block 406 are performed in the time domain. In other embodiments, however, these steps can also be performed in a spectral domain.

FIG. 9_b_ illustrates a further embodiment where a static downmix is implemented. To this end, a direction information for a first frame is extracted in block 130, and weights are calculated depending on the first frame as indicated in block 403_a_. Then, the weights are left as they are for the other frames indicated in block 408 in order to implement the static downmix.

FIG. 9_c_ illustrates an alternative implementation, where a dynamic downmix is calculated. To this end, block 132 extracts the direction information for each frame, and the weights are updated for each frame as illustrated in block 403_b_. Then, in block 405, updated weights are applied for the frames to implement the dynamic downmix that changes from frame to frame. Other implementations between those extreme cases of FIGS. 9_b_ and 9_c_ are useful as well, where, for example, weights are only updated for every second third or every n-th frame and/or a smoothing of the weights over time is performed so that the antenna characteristic does not change too much from time to time for the purpose of downmixing in accordance with the direction information. FIG. 9_d_ illustrates another implementation of the downmixer 400 as controlled by the object direction information provider 110 of FIG. 1_b_. In block 410, the downmixer is configured to analyze the direction information of all objects in a frame and, in block 112, the microphones for the purpose of calculating the weights $w_L$ and $w_R$ for the stereo example are placed in line with an analysis result where the placement of the microphone refers to the microphone location and/or microphone directivity. In block 414, the microphones are left for the other frames analogously to the static downmix discussed with respect to block 408 of FIG. 9_b_, or the microphones are updated in line with what has been discussed with respect to block 405 of FIG. 9_c_ in order to obtain the functionality of block 414 of FIG. 9_d_. With respect to the functionality of block 412, the microphones can be placed so that a good separation is obtained so that a first virtual microphone "looks" to a first group of objects and a second virtual microphone "looks" to a second group of objects, which is different from the first group of objects and advantageously different in that, as far as possible, any objects of one group are not included in the other group. Alternatively, the analysis of block 410 can be enhanced by other parameters and the placement can also be controlled by other parameters as well.

Subsequently, advantageous implementations of the decoders in accordance with the first or second aspect and is discussed with respect to, for example, FIG. 6_a_ and FIG. 6_b_ are given with respect to the following FIGS. 10_a_, 10_b_, 10_c_, 10_d_ and 11.

In block 613, the input interface 600 is configured to retrieve individual object direction information associated with object IDs. This procedure corresponds to the functionality of block 612 of FIG. 4 or 5 and results in the "codebook for a frame" as illustrated and discussed with respect to FIG. 8_b_ and, particularly, 8_c_.

Figure 10D:
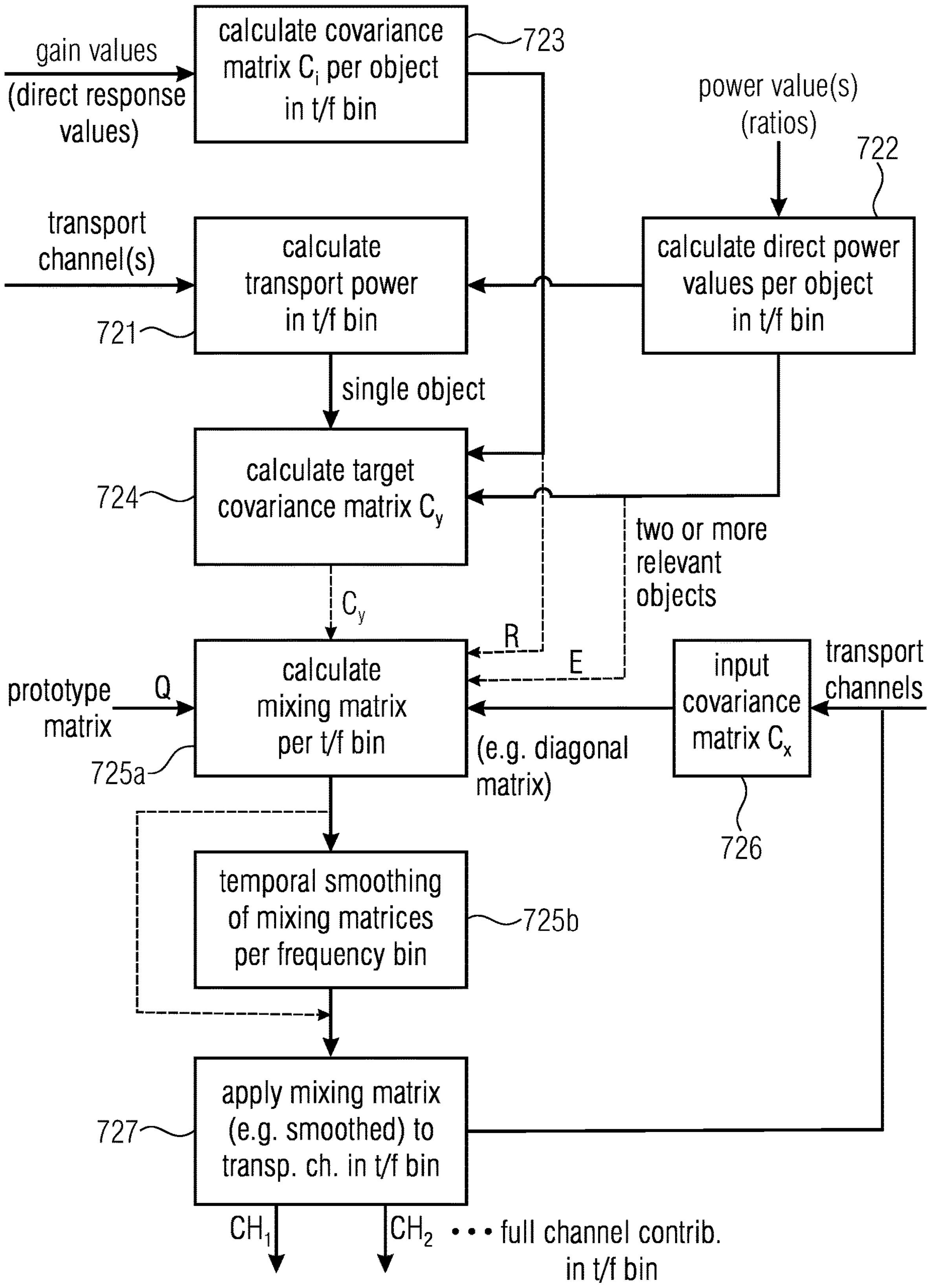
FIG. 10*d* illustrates an embodiment of the calculation of output channels of FIG. 10*a* using a covariance synthesis relying on a calculation and application of a mixing matrix.
Figure 11:
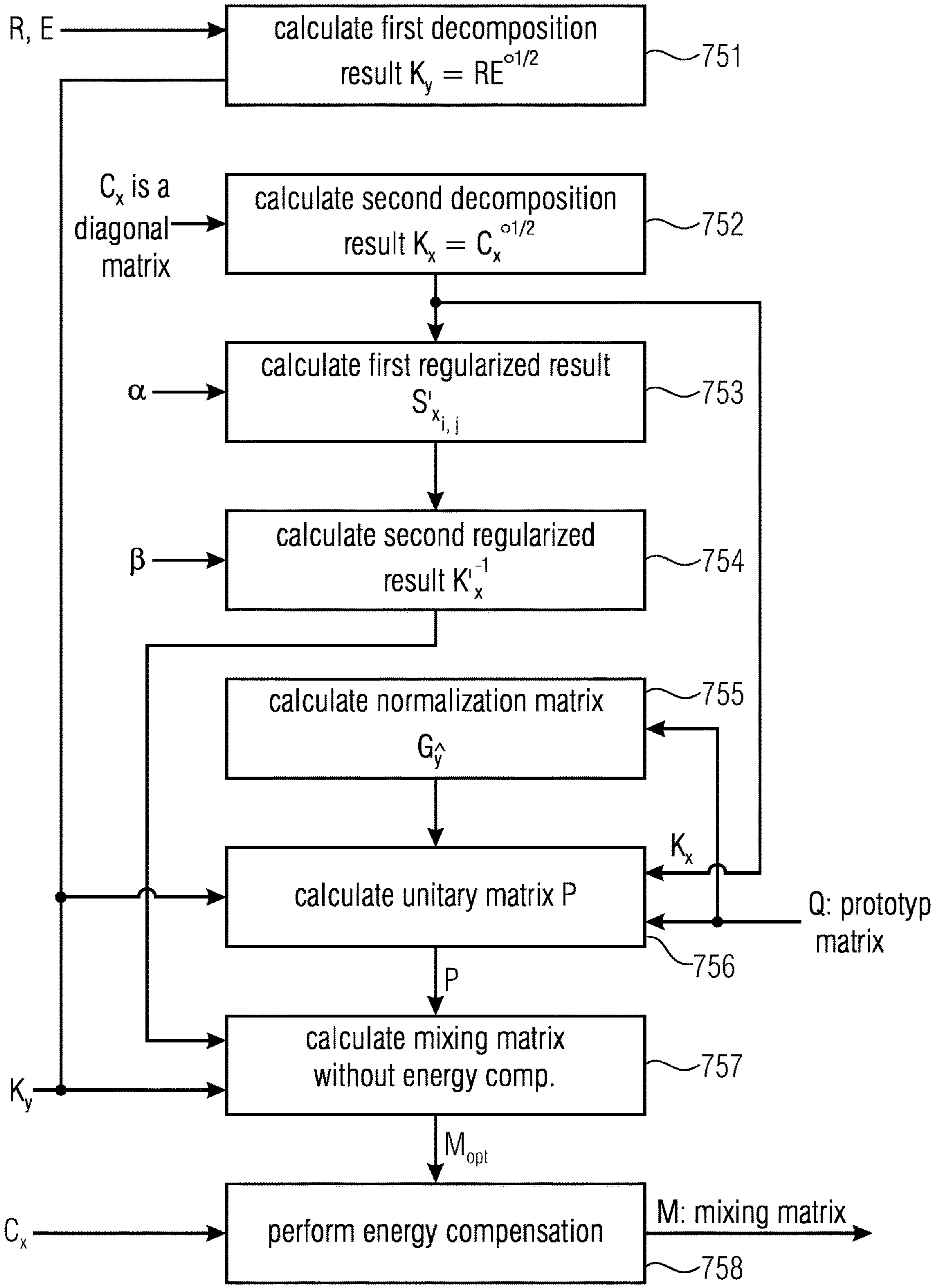
FIG. 11 illustrates several embodiments for an advanced calculation of the mixing matrix for a time/frequency bin.

Furthermore, in block 609, the one or more object IDs per time/frequency bin are retrieved irrespective of whether those data are available with respect to a low resolution parameter band or high resolution frequency tile. The result of block 609 which corresponds to the procedure of block 608 in FIG. 4 are the specific IDs in a time/frequency bin for one or more relevant objects. Then, in block 611, a specific object direction information for the specific one or more IDs for each time/frequency bin are retrieved from the "codebook for a frame", i.e., from the exemplary table illustrated in FIG. 8*c*. Then, in block 704, the gain values are calculated for the one or more relevant objects for the individual output channels as governed by the output format are calculated per time/frequency bin. Then, in block 730 or 706, 708, the output channels are calculated. Functionality of the calculation of the output channels can either be done within explicit calculation of the contribution from the one or more transport channels as illustrated in FIG. 10*b* or can be done with an indirect calculation and usage of the transport channel contributions as illustrated in FIG. 10*d* or 11. FIG. 10*b* illustrates a functionality where the power values or power ratios are retrieved in block 610 corresponding to the functionality of FIG. 4. Then, these power values are applied to the individual transport channels per each relevant object illustrated in block 733 and 735. Furthermore, these power values are applied in addition to the gain values as determined by block 704 to the individual transport channels so that block 733, 735 result in object-specific contributions of the transport channels such as transport channel ch1, ch2, . . . . Then, in block 737, these explicitly calculated channel transport contributions are added together for each output channel per time/frequency bin.

Then, depending on the implementation, a diffuse signal calculator 741 can be provided that generates a diffuse signal in the corresponding time/frequency bin for each output channel ch1, ch2, . . . , and the combination of the diffuse signal and the contribution result of block 737 is combined so that the full channel contribution in each time/frequency bin is obtained. This signal corresponds to the input into the filterbank 708 of FIG. 4, when the covariance synthesis additionally relies on a diffuse signal. When, however, the covariance synthesis 706 does not rely on a diffuse signal but only relies on a processing without any decorrelator, then at least the energy of the output signal per each time/frequency bin corresponds to the energy of the channel contribution at the output of block 739 of FIG. 10*b*. furthermore, in case the diffuse signal calculator 741 is not used, then the result of block 739 corresponds to the result of block 706 in having a full channel contribution per time/frequency bin that can be converted individual for each output channel ch1, ch2, in order to finally obtain the output audio file with the time domain output channels that can be stored, or forwarded to loudspeakers or to any kind of rendering device.

FIG. 10*c* illustrates an advantageous implementation of the functionality of block 610 of FIG. 10*b* or 4. In step 610*a*, the combined (power) value or several values are retrieved for a certain time/frequency bin. In block 610*b*, the corresponding other value for the other relevant object in the time/frequency bin is calculated based on the calculation rule that all combined values have to sum up to one.

Then, the result will advantageously be a low resolution representation where one has two power ratios per grouped timeslot index and per parameter band index. These represent a low time/frequency resolution. In block 610*c*, the time/frequency resolution can be expanded to a high time/frequency resolution so that one has the power values for the time/frequency tiles with a high resolution timeslot index n and a high resolution frequency band index k. The expansion can comprise a straightforward usage of one and the same low resolution index for the corresponding time slots within a grouped timeslot and for the corresponding frequency bands within the parameter band.

FIG. 10*d* illustrates an advantageous implementation of the functionality for the calculation of the covariance synthesis information in block 706 of FIG. 4 that is represented by the mixing matrix 725 that is used for mixing the two or more input transport channels into two or more output signals. Thus, when one has, for example, two transport channels and six output channels, the size of the mixing matrix for each individual time/frequency bin will be six rows and two columns. In block 723 corresponding to the functionality of block 723 in FIG. 5, the gain values or direct response values per object in each time/frequency bin are received, and a covariance matrix is calculated. In block 722, the power values or ratios are received and direct power values per object in a time/frequency bin are calculated, and block 722 in FIG. 10*d* corresponds to block 722 of FIG. 5.

Both, the result of block 721 and 722 are input into a target covariance matrix calculator 724. Additionally or alternatively, an explicit calculation of the target covariance matrix $C_y$ is not necessary. Instead, the relevant information included in the target covariance matrix, i.e., the direct response value information indicated in matrix R and the direct power values indicated in matrix E for the two or more relevant objects are input into the block 725*a* for calculating the mixing matrix per time/frequency bin. Additionally, the mixing matrix 725*a* receives information on the prototype matrix Q and an input covariance matrix $C_x$ derived from the two or more transport channels illustrated in block 726 corresponding to block 726 of FIG. 5. The mixing matrix per time/frequency bin and frame can be subjected to a temporal smoothing as illustrated in block 725*b* and, in block 727 corresponding to at least a part of the rendering block of FIG. 5, the mixing matrix is applied either in the non-smoothed or smoothed form, to the transport channels in the corresponding time/frequency bins in order to obtain the full channel contribution in the time/frequency bin substantially similar to the corresponding full contribution as discussed before with respect to FIG. 10*b* at the output of block 739. Thus, FIG. 10*b* illustrates the implementation of the explicit calculation of the transport channel contribution while FIG. 10*d* illustrates the procedure with the implicit calculation of the transport channel contributions per time/frequency bin and per relevant object in each time frequency bin via the target covariance matrix $C_y$ or via the pertinent information R and E of block 723 and 722 directly introduced into the mixing matrix calculation block 725*a*.

Subsequently, the advantageous optimized algorithm for the covariance synthesis is illustrated with respect to FIG. 11. It is to be outlined that all the steps illustrated in FIG. 11 are calculated within the covariance synthesis 706 of FIG. 4 or within the mixing matrix calculation block 725 of FIG. 5 or 725*a* in FIG. 10*d*. In step 751, a first decomposition result $K_y$ is calculated. This decomposition result can be easily calculated due to the fact that, as illustrated in FIG. 10*d*, the information of the gained values included in matrix R and the information from the two or more relevant objects, particularly, the direct power information included in matrix ER directly used without an explicit calculation of the covariance matrix. Thus, the first decomposition result in block 751 can be calculated straightforwardly and without much effort, since a specific singular value decomposition is not necessary anymore.

In step 752, a second decomposition result is calculated as $K_x$. This decomposition result can also be calculated without an explicit singular value decomposition, since the input covariance matrix is treated as a diagonal matrix, where the non-diagonal elements are ignored.

Then, in step 753, a first regularized result based on the first regularization parameter a is calculated, and in step 754, a second regularized result is calculated based on the second regularization parameter beta. To the effect that $K_x$ is, in the advantageous implementation a diagonal matrix, the calculation of the first regularized result 753 is simplified with respect to the known technology, since the calculation of $S_x$ is just a parameter change rather than a decomposition as in the known technology.

Furthermore, with respect to the calculation of the second regularized result in block 754, the first step is additionally only a parameter renaming rather than a multiplication with a matrix $U_x^{HS}$ in the known technology.

Furthermore, in step 755, a normalization matrix $G^y$ is calculated, and based on the step 755, a unitary matrix P is calculated in step 756 based on $K_x$ and the prototype matrix Q and the information of $K_y$ as obtained by block 751. Due to the fact that any matrix Λ is not necessary here, the calculation of the unitary matrix P is simplified with respect to the known technology as availed.

Then, in step 757, a mixing matrix without energy compensation is calculated which is $M_{opt}$, and for that, the unitary matrix P, the result of block 754 and the result of block 751 are used. Then, in block 758, an energy compensation is performed using compensation matrix G. The energy compensation is performed so that any residual signal derived from a decorrelator is not necessary. However, instead of performing the energy compensation, a residual signal with an energy large enough to fill the energy gap left by the mixing matrix $M_{opt}$ without energy information would be added in this implementation. However, for the purpose of the present invention, a decorrelated signal is not relied upon in order to avoid any artifacts introduced by a decorrelator. But an energy compensation as shown in step 758 is of advantage.

Therefore, the optimized algorithm for the covariance synthesis provides advantages in step 751, 752, 753, 754, and also within step 756 for the calculation of the unitary matrix P. It is to be emphasized that an optimized algorithm even provides advantages over the known technology where only one of the steps 755, 752, 753, 754, 756 or only a sub-group of those steps is implemented as illustrated, but the corresponding other steps are implemented as in the known technology. The reason is that the improvements do not rely on each other, but can be applied independently from each other. However, the more improvements are implemented, the better the procedure will be with respect to the complexity for an implementation. Thus, the full implementation of the FIG. 11 embodiment is of advantage, since it provides the highest amount of complexity reduction, but even when only one of the steps 751, 752, 753, 754, 756 are implemented in accordance with the optimized algorithm and the other steps are implemented as in the known technology, a complexity reduction without any quality deterioration is obtained.

Embodiments of the invention can also be considered as a procedure to generate comfort noise for stereophonic signal by mixing three Gaussian noise sources, one for each channel and the third common noise source to create correlated background noise, or additionally or separately, to control the mixing of the noise sources with the coherence value that is transmitted with the SID frame.

It is to be mentioned here that all alternatives or aspects as discussed before and below and all aspects as defined by claims in the following claims or aspects can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Aspects (to be used independently from each other or together with all other aspects or only a subgroup of the other aspects)

Apparatus, or method or computer program comprising one of more of the below mentioned features:

Inventive Examples with Respect to Novel Aspects:

- Multi-wave idea is combined with object coding (use more than one directional cue per T/F tile)
- Object coding approach that is as close as possible to the DirAC paradigm, to allow any kind of input types in IVAS (object content not covered so far)

Inventive Examples with Respect to Parametrization (Encoder):

- For each T/F tile: selection information for n most relevant objects in this T/F tile plus power ratios between those n most relevant object contributions
- For each frame, for each object: one direction Inventive Examples with Respect to Rendering (Decoder):

- Get direct response values for each relevant object from transmitted object indices and direction information and target output layout
- Get covariance matrix from direct responses
- Calculate direct power from downmix signal power and transmitted power ratios for each relevant object
- Get final target covariance matrix from direct power and covariance matrix
- Use only diagonal elements of input covariance matrix Optimized Covariance Synthesis Some side notes on differences to SAOC:

- n dominant objects are considered instead of all objects
  - power ratios thus related to OLDs but calculated differently
- SAOC does not make use of directions at the encoder->direction information only introduced at decoder (rendering matrix)
  - SAOC-3D decoder receives object metadata for rendering matrix
- SAOC employs a downmix matrix and transmits downmix gains
- diffuseness is not considered in an embodiment of the present invention Subsequently, further examples of the invention are summarized.

1. Apparatus for encoding a plurality of audio objects and related metadata indicating direction information on the plurality of audio objects, comprising:

- a downmixer (400) for downmixing the plurality of audio objects to obtain one or more transport channels;
- a transport channel encoder (300) for encoding one or more transport channels to obtain one or more encoded transport channels; and
- an output interface (200) for outputting an encoded audio signal comprising the one or more encoded transport channels,
- wherein the downmixer (400) is configured to downmix the plurality of audio objects in response to the direction information on the plurality of audio objects.

2. Apparatus of example 1, wherein the downmixer (400) is configured

- to generate two transport channels as two virtual microphone signals arranged at the same position and having different orientations or at two different positions with respect to a reference position or orientation such as a virtual listener position or orientation, or
- to generate three transport channels as three virtual microphone signals arranged at the same position and having different orientations or at three different positions with respect to a reference position or orientation such as a virtual listener position or orientation, or
- to generate four transport channels as four virtual microphone signals arranged at the same position and having different orientations or at four different positions with respect to a reference position or orientation such as a virtual listener position or orientation, or
- wherein the virtual microphone signals are virtual first order microphone signals, or virtual cardioid microphone signals, or virtual figure of 8 or dipole or bidirectional microphone signals, or virtual directional microphone signals, or virtual subcardioid microphone signals, or virtual unidirectional microphone signals, or virtual hypercardioid microphone signals, or virtual omnidirectional microphone signals.

3. Apparatus of example 1 or 2, wherein the downmixer (400) is configured

- to derive (402), for each audio object of the plurality of audio objects, a weighting information for each transport channel using the direction information for the corresponding audio object;
- to weight (404) the corresponding audio object using the weighting information for the audio object for a specific transport channel to obtain an object contribution for the specific transport channel, and
- to combine (406) the object contributions for the specific transport channel from the plurality of audio objects to obtain the specific transport channel.

4. Apparatus of one of the preceding examples,

- wherein the downmixer (400) is configured to calculate the one or more transport channels as one or more virtual microphone signals arranged at the same position and having different orientations or at different positions with respect to a reference position or orientation such as a virtual listener position or orientation, to which the direction information is related,
- wherein the different positions or orientations are on or to a left side of a center line and on or to a right side of the center line, or wherein the different positions or orientations are equally or non-equally distributed to horizontal positions or orientations such as +90 degrees or −90 degrees with respect to the center line or −120 degrees, 0 degrees and +120 degrees with respect to the center line, or wherein the different positions or orientations comprise at least one position or orientation being directed upwards or downwards with respect to a horizontal plane in which a virtual listener is placed, wherein the direction information on the plurality of audio objects is related to the virtual listener position or reference position or orientation.

5. Apparatus in accordance with one of the preceding examples, further comprising:

- a parameter processor (110) for quantizing the metadata indicating the direction information on the plurality of audio objects to obtain quantized direction items for the plurality of audio objects, wherein the downmixer (400) is configured to operate in response to the quantized direction items as the direction information, and wherein the output interface (200) is configured to introduce information on the quantized direction items into the encoded audio signal.

6. Apparatus of one of the preceding examples, wherein the downmixer (400) is configured to perform an analysis of the direction information on the plurality of audio objects and to place one or more virtual microphones for the generation of the transport channels depending on a result of the analysis.

7. Apparatus of one of the preceding examples, wherein the downmixer (400) is configured to downmix (408) using a downmixing rule being static over the plurality of time frames, or wherein the direction information is variable over a plurality of time frames, and wherein the downmixer (400) is configured to downmix (405) using a downmixing rule being variable over the plurality of time frames.

8. Apparatus of one of the preceding examples, wherein the downmixer (400) is configured to downmix in a time domain using a sample-by-sample weighting and combining of samples of the plurality of audio objects.

9. Apparatus of one of the preceding examples, further comprising:

an object parameter calculator (100) configured for calculating, for one or more frequency bins of a plurality of frequency bins related to a time frame, parameter data for at least two relevant audio objects, wherein a number of the at least two relevant audio objects is lower than a total number of the plurality of audio objects, and wherein the output interface (200) is configured to introduce information on the parameter data for the at least two relevant audio objects for the one or more frequency bins into the encoded audio signal.

10. Apparatus of example 9, wherein the object parameter calculator (100) is configured to convert (120) each audio object of the plurality of audio objects into a spectral representation having the plurality of frequency bins, to calculate (122) a selection information from each audio object for the one or more frequency bins, and to derive (124) object identifications as the parameter data indicating the at least two relevant audio objects, based on the selection information, and wherein the output interface (200) is configured to introduce information on the object identifications into the encoded audio signal.

11. Apparatus of example 9 or 10, wherein the object parameter calculator (100) is configured to quantize and encode (212) one or more amplitude related measures or one or more combined values derived from the amplitude related measures of the relevant audio objects in the one or more frequency bins as the parameter data, and wherein the output interface (200) is configured to introduce the quantized one or more amplitude related measure or the quantized one or more combined values into the encoded audio signal.

12. Apparatus of example 10 or 11, wherein the selection information is an amplitude-related measure such as an amplitude value, a power value or a loudness value or an amplitude raised to a power being different from one for the audio object, and wherein the object parameter calculator (100) is configured to calculate (127) a combined value such as a ratio from an amplitude related measure of a relevant audio object and a sum of two or more amplitude related measures of the relevant audio objects, and wherein the output interface (200) is configured to introduce an information on the combined value into the encoded audio signal, wherein a number of information items on the combined values in the encoded audio signal is equal to at least one and is lower than the number of relevant audio objects for the one or more frequency bins.

13. Apparatus of one of examples 10 to 12, wherein the object parameter calculator (100) is configured to select the object identifications based on an order of the selection information of the plurality of audio objects in the one or more frequency bins.

14. Apparatus of one of examples 10 to 13, wherein the object parameter calculator (100) is configured to calculate (122) a signal power as the selection information, to derive (124) the object identifications for the two or more audio objects having the greatest signal power values in the corresponding one or more frequency bins for each frequency bin separately, to calculate (126) a power ratio between the sum of the signal powers of the two or more audio objects having the greatest signal power values and the signal power of at least one of the audio objects having the derived object identifications as the parameter data, and to quantize and encode (212) the power ratio, and wherein the output interface (200) is configured to introduce the quantized and encoded power ratio into the encoded audio signal.

15. Apparatus of one of examples 10 to 14, wherein the output interface (200) is configured to introduce, into the encoded audio signal, one or more encoded transport channels, as the parameter data, two or more encoded object identifications for the relevant audio objects for each one of the one or more frequency bins of the plurality of frequency bins in the time frame, and one or more encoded combined values or encoded amplitude related measures, and quantized and encoded direction data for each audio object in the time frame, the direction data being constant for all frequency bins of the one or more frequency bins.

16. Apparatus of one of examples 9 to 15, wherein the object parameter calculator (100) is configured to calculate the parameter data for at least the most dominant object and the second most dominant object in the one or more frequency bins, or wherein a number of audio objects of the plurality of audio objects is three or more, the plurality of audio objects comprising a first audio object, a second audio object and a third audio object, and wherein the object parameter calculator (100) is configured to calculate for a first one of the one or more frequency bins, as the relevant audio objects, only a first group of audio objects such as the first audio object and the second audio object, and to calculate, as the relevant audio objects for a second frequency bin of the one or more frequency bins, only a second group of audio objects, such as the second audio object and the third audio object or the first audio object and the third audio object, wherein the first group of audio objects is different from the second group of audio objects at least with respect to one group member.

17. Apparatus of one of examples 9 to 16, wherein the object parameter calculator (100) is configured to calculate raw parametric data with a first time or frequency resolution and to combine the raw parametric data into combined parametric data having a second time or frequency resolution being lower than the first time of frequency resolution, and, and to calculate the parameter data for the at least two relevant audio objects with respect to the combined parametric data having the second time or frequency resolution, or to determine parameter bands having a second time or frequency resolution being different from a first time or frequency resolution used in a time or frequency decomposition of the plurality of audio objects, and to calculate the parameter data for the at least two relevant audio objects for the parameter bands having the second time or frequency resolution.

18. Decoder for decoding an encoded audio signal comprising one or more transport channels and direction information for a plurality of audio objects, and, for one or more frequency bins of a time frame, parameter data for an audio object, the decoder comprising:

an input interface (600) for providing the one or more transport channels in a spectral representation having, in the time frame, the plurality of frequency bins; and an audio renderer (700) for rendering the one or more transport channels into a number of audio channels using the direction information, wherein the audio renderer (700) is configured to calculate a direct response information (704) from the one or more audio objects per each frequency bin of the plurality of frequency bins and the direction information (810) associated with the relevant one or more audio objects in the frequency bins.

19. Decoder of example 18, wherein the audio renderer (700) is configured to calculate (706) a covariance synthesis information using the direct response information and an information (702) on the number of audio channels, and to apply (727) the covariance synthesis information to the one or more transport channels to obtain the number of audio channels, or wherein the direct response information (704) is a direct response vector for each one or more audio object, and wherein the covariance synthesis information is a covariance synthesis matrix, and wherein the audio renderer (700) is configured to perform a matrix operation per frequency bin in applying (727) the covariance synthesis information.

20. Decoder of example 18 or 19, wherein the audio renderer (700) is configured to derive, in the calculation of the direct response information (704), a direct response vector for the one or more audio objects and to calculate, for the one or more audio objects, a covariance matrix from each direct response vector, to derive (724), in the calculation of the covariance synthesis information, a target covariance information from the covariance matrix of the one audio object or the covariant matrices from more audio objects, a power information on the respective one or more audio objects, and a power information derived from the one or more transport channels.

21. Decoder of example 20, wherein the audio renderer (700) is configured to derive, in the calculation of the direct response information, a direct response vector for the one or more audio object and to calculate (723), for each one or more audio objects, a covariance matrix from each direct response vector, to derive (726) an input covariance information from the transport channels, and to derive (725*a*, 725*b*) a mixing information from the target covariance information, the input covariance information and the information on the number of channels, and to apply (727) the mixing information to the transport channels for each frequency bin in the time frame.

22. Decoder of example 21, wherein a result of the application of the mixing information for each frequency bin in the time frame is converted (708) into a time domain to obtain the number of audio channels in the time domain.

23. Decoder of one of examples 18 to 22, wherein the audio renderer (700) is configured to only use main diagonal elements of an input covariance matrix derived from the transport channels in a decomposition (752) of the input covariance matrix, or to perform a decomposition (751) of a target covariance matrix using a direct response matrix and a matrix of powers of the objects or transport channels, or to perform (752) a decomposition of the input covariance matrix by taking the root of each main diagonal element of the input covariance matrix, or to calculate (753) a regularized inverse of decomposed input covariance matrix, or to perform (756) a singular value decomposition in calculating an optimum matrix to be used in an energy compensation without an extended identity matrix.

24. Decoder of one of examples 18 to 23, wherein the parameter data for the one or more audio objects comprise parameter data for at least two relevant audio objects, wherein a number of the at least two relevant audio objects is lower than a total number of the plurality of audio objects, and wherein the audio renderer (700) is configured to calculate, for each one of the one or more frequency bins, a contribution from the one or more transport channels in accordance with a first direction information associated with a first one of the at least two relevant audio objects and in accordance with a second direction information associated with a second one of the at least two relevant audio objects.

25. Decoder of example 24, wherein the audio renderer (700) is configured to ignore, for the one or more frequency bins, a direction information of an audio object different from the at least two relevant audio objects.

26. Decoder of example 24 or 25, wherein the encoded audio signal comprises an amplitude related measure for each relevant audio object or a combined value related to at least two relevant audio objects in the parameter data, and wherein the audio renderer (700) is configured to operate so that a contribution from the one or more transport channels in accordance with a first direction information associated with a first one of the at least two relevant audio objects and in accordance with a second direction information associated with a second one of the at least two relevant audio objects is accounted for, or to determine a quantitative contribution of the one or more transport channels in accordance with the amplitude-related measure or the combined value.

27. Decoder of example 26, wherein the encoded signal comprises the combined value in the parameter data, and wherein the audio renderer (700) is configured to determine the contribution of the one or more transport channels using the combined value for one of the relevant audio objects and the direction information for the one relevant audio object, and wherein the audio renderer (700) is configured to determine the contribution for the one or more transport channels using a value derived from the combined value for another of the relevant audio objects in the one or more frequency bins and the direction information of the other relevant audio object.

28. Decoder of one of examples 24 to 27, wherein the audio renderer (700) is configured to calculate the direct response information (704) from the relevant audio objects per each frequency bin of the plurality of frequency bins and the direction information associated with the relevant audio objects in the frequency bins, 29. Decoder of example 28, wherein the audio renderer (700) is configured to determine (741) a diffuse signal per each frequency bin of the plurality of frequency bins using a diffuseness information such as a diffuseness parameter included in the metadata or a decorrelation rule and to combine a direct response as determined by the direct response information and the diffuse signal to obtain a spectral domain rendered signal for a channel of the number of channels.

30. Method of encoding a plurality of audio objects and related metadata indicating direction information on the plurality of audio objects, comprising:

downmixing the plurality of audio objects to obtain one or more transport channels;

encoding the one or more transport channels to obtain one or more encoded transport channels; and outputting an encoded audio signal comprising the one or more encoded transport channels, wherein the downmixing comprises downmixing the plurality of audio objects in response to the direction information on the plurality of audio objects.

31. Method of decoding an encoded audio signal comprising one or more transport channels and direction information for a plurality of audio objects, and, for one or more frequency bins of a time frame, parameter data for an audio object, the method comprising:

providing the one or more transport channels in a spectral representation having, in the time frame, the plurality of frequency bins; and audio rendering the one or more transport channels into a number of audio channels using the direction information, wherein the audio rendering comprises calculating a direct response information from the one or more audio objects per each frequency bin of the plurality of frequency bins and the direction information associated with the relevant one or more audio objects in the frequency bins.

32. Computer program for performing, when running on a computer or a processor, the method of example 30 or the method of example 31.

2 BIBLIOGRAPHY OR REFERENCES

[Pulkki2009]V. Pulkki, M-V. Laitinen, J. Vilkamo, J. Ahonen, T. Lokki, and T. Pihlajamäki, "Directional audio coding perception-based reproduction of spatial sound", International Workshop on the Principles and Application on Spatial Hearing, November 2009, Zao; Miyagi, Japan.

[SAOC_STD] ISO/IEC, "MPEG audio technologies Part 2: Spatial Audio Object Coding (SAOC)." ISO/IEC JTC1/SC29/WG11 (MPEG) International Standard 23003-2.

[SAOC_AES] J. Herre, H. Purnhagen, J. Koppens, O. Hellmuth, J. Engdegård, J. Hilpert, L. Villemoes, L. Terentiv, C. Falch, A. Hölzer, M. L. Valero, B. Resch, H. Mundt H, and H. Oh, "MPEG spatial audio object coding—the ISO/MPEG standard for efficient coding of interactive audio scenes," *J. AES*, vol. 60, no. 9, pp. 655-673, September 2012.

[MPEGH_AES] J. Herre, J. Hilpert, A. Kuntz, and J. Plogsties, "MPEG-H audio—the new standard for universal spatial/3D audio coding," in *Proc. 137th AES Conv.*, Los Angeles, CA, USA, 2014.

[MPEGH_IEEE] J. Herre, J. Hilpert, A. Kuntz, and J. Plogsties, "MPEG-H 3D Audio—The New Standard for Coding of Immersive Spatial Audio", IEEE JOURNAL OF SELECTED TOPICS IN SIGNAL PROCESSING, VOL. 9, NO. 5, AUGUST 2015

[MPEGH_STD] *Text of ISO/MPEG* 23008-3/*DIS* 3*D Audio*, Sapporo, ISO/IEC JTC1/SC29/WG11 N14747, July 2014.

[SAOC_3D_PAT] APPARATUS AND METHOD FOR ENHANCED SPATAL AUDIO OBJECT CODING, WO 2015/011024 A1

[Pulkki1997] V. Pulkki, "Virtual sound source positioning using vector base amplitude panning," *J. Audio Eng. Soc.*, vol. 45, no. 6, pp. 456-466, June 1997.

[DELAUNAY] C. B. Barber, D. P. Dobkin, and H. Huhdanpaa, "The quickhull algorithm for convex hulls," in *Proc. ACM Trans. Math. Software* (TOMS), New York, NY, USA, December 1996, vol. 22, pp. 469-483.

[Hirvonen2009] T. Hirvonen, J. Ahonen, and V. Pulkki, "Perceptual compression methods for metadata in Directional Audio Coding applied to audiovisual teleconference", AES 126th Convention 2009, May 7-10, Munich, Germany.

[Borβ2014] C. Borβ, "A Polygon-Based Panning Method for 3D Loudspeaker Setups", AES 137th Convention 2014, October 9-12, Los Angeles, USA.

[WO2019068638] Apparatus, method and computer program for encoding, decoding, scene processing and other procedures related to DirAC based spatial audio coding, 2018

[WO2020249815] PARAMETER ENCODING AND DECODING FOR MULTICHANNEL AUDIO USING DirAC, 2019

[BCC2001] C. Faller, F. Baumgarte: "Efficient representation of spatial audio using perceptual parametrization", Proceedings of the 2001 IEEE Workshop on the Applications of Signal Processing to Audio and Acoustics (Cat. No. 01TH8575).

[JOC_AES] Heiko Purnhagen; Toni Hirvonen; Lars Villemoes; Jonas Samuelsson; Janusz Klejsa: "Immersive Audio Delivery Using Joint Object Coding", 140th AES Convention, Paper Number: 9587, Paris, May 2016.

[AC4_AES]K. Kjörling, J. Rödén, M. Wolters, J. Riedmiller, A. Biswas, P. Ekstrand, A. Gröschel, P. Hedelin, T. Hirvonen, H. Hörich, J. Klejsa, J. Koppens, K. Krauss, H-M. Lehtonen, K. Linzmeier, H. Muesch, H. Mundt, S. Norcross, J. Popp, H. Purnhagen, J. Samuelsson, M. Schug, L. Sehlström, R. Thesing, L. Villemoes, and M. Vinton: "AC-4—The Next Generation Audio Codec", 140th AES Convention, Paper Number: 9491, Paris, May 2016.

[Vilkamo2013] J. Vilkamo, T. Bäckström, A. Kuntz, "Optimized covariance domain framework for time-frequency processing of spatial audio", Journal of the Audio Engineering Society, 2013.

[Golub2013] Gene H. Golub and Charles F. Van Loan, "Matrix Computations", Johns Hopkins University Press, 4th edition, 2013.

The invention claimed is:

1. An apparatus for encoding a plurality of audio objects, comprising:

an object parameter calculator configured for calculating, for one or more frequency bins of a plurality of frequency bins related to a time frame, parameter data for at least two relevant audio objects, wherein a number of the at least two relevant audio objects is lower than a total number of the plurality of audio objects, wherein the object parameter calculator is configured for performing a selection of the number of the at least two relevant audio objects and for not indicating the total number of audio objects as being relevant, wherein the object parameter calculator is configured to convert each audio object of the plurality of audio objects into a spectral representation comprising the plurality of frequency bins, to calculate a selection information from each audio object for the one or more frequency bins, wherein the selection information is an amplitude-related measure for the audio object, to calculate a combined value from two relevant audio objects of the at least two relevant audio objects, and to derive object identifications as the parameter data indicating the at least two relevant audio objects, based on the selection information, and an output interface for outputting an encoded audio signal comprising information on the object identifications as the parameter data for the at least two relevant audio objects, and one or more information items on the combined value or on more combined values, wherein a number of information items on the combined value or on the more combined values is equal to at least one and is lower than the number of relevant audio objects for the one or more frequency bins.

2. The apparatus of claim 1, wherein the object parameter calculator is configured to quantize and encode one or more amplitude related measures or the one or more combined values derived from the amplitude related measures of the relevant audio objects in the one or more frequency bins as the parameter data, and wherein the output interface is configured to introduce the quantized one or more amplitude related measures or the quantized one or more combined values into the encoded audio signal.

3. The apparatus of claim 1, wherein the amplitude-related measure is an amplitude value, a power value or a loudness value or an amplitude raised to a power being different from one for the audio object, and wherein the combined value is a ratio from an amplitude related measure of a relevant audio object and a sum of two or more amplitude related measures of the relevant audio objects.

4. The apparatus of claim 1, wherein the object parameter calculator is configured to calculate a signal power as the selection information, to derive the object identifications for the two or more audio objects comprising the greatest signal power values in the corresponding one or more frequency bins for each frequency bin separately, to calculate a power ratio between the sum of the signal powers of the two or more audio objects comprising the greatest signal power values and the signal power of each of the audio objects comprising the derived object identifications as the parameter data, and to quantize and encode the power ratio, and wherein the output interface is configured to introduce the quantized and encoded power ratio into the encoded audio signal.

5. An apparatus for encoding a plurality of audio objects, comprising:

an object parameter calculator configured for calculating, for one or more frequency bins of a plurality of frequency bins related to a time frame, parameter data for at least two relevant audio objects, wherein a number of the at least two relevant audio objects is lower than a total number of the plurality of audio objects, wherein the object parameter calculator is configured for performing a selection of the number of the at least two relevant audio objects and for not indicating the total number of audio objects as being relevant, wherein the object parameter calculator is configured to convert each audio object of the plurality of audio objects into a spectral representation comprising the plurality of frequency bins, to calculate a selection information from each audio object for the one or more frequency bins, and to select object identifications as the parameter data indicating the at least two relevant audio objects, based on an order of the selection information of the plurality of audio objects in the one or more frequency bins, and an output interface for outputting an encoded audio signal comprising, as the parameter data, information on the object identifications for the at least two relevant audio objects.

6. An apparatus for encoding a plurality of audio objects, comprising:

an object parameter calculator configured for calculating, for one or more frequency bins of a plurality of frequency bins related to a time frame, parameter data for at least two relevant audio objects, wherein a number of the at least two relevant audio objects is lower than a total number of the plurality of audio objects, wherein the object parameter calculator is configured for performing a selection of the number of the at least two relevant audio objects and for not indicating the total number of audio objects as being relevant; and an output interface for outputting an encoded audio signal comprising the parameter data for the at least two relevant audio objects, wherein the output interface is configured to introduce, into the encoded audio signal, one or more encoded transport channels, as the parameter data, two or more encoded object identifications for the relevant audio objects for the one or more frequency bins of the plurality of frequency bins in the time frame, and one or more encoded combined values or encoded amplitude related measures, and quantized and encoded direction data for each audio object in the time frame, the direction data being constant for all frequency bins of the one or more frequency bins, or wherein the object parameter calculator is configured to calculate the parameter data for at least a most dominant object and a second most dominant object in the one or more frequency bins, wherein the most dominant object and the second most dominant object represent the relevant objects, or wherein a number of audio objects of the plurality of audio objects is three or more, the plurality of audio objects comprising a first audio object, a second audio object and a third audio object, and wherein the object parameter calculator is configured to calculate for a first one of the one or more frequency bins, as the relevant audio objects, only a first group of audio objects, and to calculate, as the relevant audio objects for a second frequency bin of the one or more frequency bins, only a second group of audio objects, wherein the first group of audio objects is different from the second group of audio objects at least with respect to one group member, or wherein the object parameter calculator is configured to calculate raw parametric data with a first time or frequency resolution and to combine the raw parametric data into combined parametric data comprising a second time or frequency resolution being lower than the first time of frequency resolution, and to calculate the parameter data for the at least two relevant audio objects with respect to the combined parametric data comprising the second time or frequency resolution, or to determine parameter bands comprising a second time or frequency resolution being different from a first time or frequency resolution used in a time or frequency decomposition of the plurality of audio objects, and to calculate the parameter data for the at least two relevant audio objects for the parameter bands comprising the second time or frequency resolution.

7. An apparatus for encoding a plurality of audio objects, comprising:

an object parameter calculator configured for calculating, for one or more frequency bins of a plurality of frequency bins related to a time frame, parameter data for at least two relevant audio objects, wherein a number of the at least two relevant audio objects is lower than a total number of the plurality of audio objects, wherein the object parameter calculator is configured for performing a selection of the number of the at least two relevant audio objects and for not indicating the total number of audio objects as being relevant; and an output interface for outputting an encoded audio signal comprising the parameter data for the at least two relevant audio objects, wherein the plurality of audio objects comprise related metadata indicating direction information on the plurality of audio objects, and wherein the apparatus further comprises:

a downmixer for downmixing the plurality of audio objects to acquire one or more transport channels, wherein the downmixer is configured to downmix the plurality of audio objects in response to the direction information on the plurality of audio objects; and a transport channel encoder for encoding one or more transport channels to acquire one or more encoded transport channels; and wherein the output interface is configured to introduce the one or more transport channels into the encoded audio signal.

8. The apparatus of claim 7, wherein the downmixer is configured to generate two transport channels as two virtual microphone signals arranged at the same position and comprising different orientations or at two different positions with respect to a reference position or orientation, or to generate three transport channels as three virtual microphone signals arranged at the same position and comprising different orientations or at three different positions with respect to a reference position or orientation, or to generate four transport channels as four virtual microphone signals arranged at the same position and comprising different orientations or at four different positions with respect to a reference position or orientation, or wherein the virtual microphone signals are virtual first order microphone signals, or virtual cardioid microphone signals, or virtual figure of 8 or dipole or bidirectional microphone signals, or virtual directional microphone signals, or virtual subcardioid microphone signals, or virtual unidirectional microphone signals, or virtual hypercardioid microphone signals, or virtual omnidirectional microphone signals.

9. The apparatus of claim 7, wherein the downmixer is configured to derive, for each audio object of the plurality of audio objects, a weighting information for each transport channel using the direction information for the corresponding audio object;

to weight the corresponding audio object using the weighting information for the audio object for a specific transport channel to acquire an object contribution for the specific transport channel, and to combine the object contributions for the specific transport channel from the plurality of audio objects to acquire the specific transport channel.

10. The apparatus of claim 7, wherein the downmixer is configured to calculate the one or more transport channels as one or more virtual microphone signals arranged at the same position and comprising different orientations or at different positions with respect to a reference position or orientation, to which the direction information is related, wherein the different positions or orientations are on or to a left side of a center line and on or to a right side of the center line, or wherein the different positions or orientations are equally or non-equally distributed to horizontal positions or orientations, or wherein the different positions or orientations comprise at least one position or orientation being directed upwards or downwards with respect to a horizontal plane in which a virtual listener is placed, wherein the direction information on the plurality of audio objects is related to the virtual listener position or reference position or orientation.

11. The apparatus in accordance with claim 7, further comprising:

a parameter processor for quantizing the metadata indicating the direction information on the plurality of audio objects to acquire quantized direction items for the plurality of audio objects, wherein the downmixer is configured to operate in response to the quantized direction items as the direction information, and wherein the output interface is configured to introduce information on the quantized direction items into the encoded audio signal.

12. The apparatus of claim 7, wherein the downmixer is configured to perform an analysis of the direction information on the plurality of audio objects and to place one or more virtual microphones for the generation of the transport channels depending on a result of the analysis.

13. The apparatus of claim 7, wherein the downmixer is configured to downmix using a downmixing rule being static over the plurality of time frames, or wherein the direction information is variable over a plurality of time frames, and wherein the downmixer is configured to downmix using a downmixing rule being variable over the plurality of time frames.

14. The apparatus of claim 7, wherein the downmixer is configured to downmix in a time domain using a sample-by-sample weighting and combining of samples of the plurality of audio objects.

15. A decoder for decoding an encoded audio signal comprising one or more transport channels and direction information for a plurality of audio objects, the direction information comprising a first direction information and a second direction information, and, for one or more frequency bins of a time frame, parameter data for at least two relevant audio objects, wherein a number of the at least two relevant audio objects is lower than a total number of the plurality of audio objects, wherein the number of the at least two relevant audio objects is a selection from the total number of audio objects, wherein the total number of audio objects is not indicated as being relevant, the decoder comprising:

an input interface for providing the one or more transport channels in a spectral representation comprising, in the time frame, the plurality of frequency bins; and an audio renderer for rendering the one or more transport channels into a number of audio channels using the direction information, so that a contribution from the one or more transport channels in accordance with the first direction information associated with a first one of the at least two relevant audio objects and in accordance with the second direction information associated with a second one of the at least two relevant audio objects is accounted for, or an audio renderer for rendering the one or more transport channels into a number of audio channels using the direction information, the audio renderer being configured to calculate, for each one of the one or more frequency bins, a contribution from the one or more transport channels in accordance with the first direction information associated with a first one of the at least two relevant audio objects and in accordance with the second direction information associated with a second one of the at least two relevant audio objects.

16. The decoder of claim 15, wherein the audio renderer is configured to ignore, for the one or more frequency bins, a direction information of an audio object different from the at least two relevant audio objects.

17. The decoder of claim 15, wherein the encoded audio signal comprises an amplitude related measure for each relevant audio object or a combined value related to at least two relevant audio objects in the parameter data, and wherein the audio renderer is configured to determine a quantitative contribution of the one or more transport channels in accordance with the amplitude-related measure or the combined value.

18. The decoder of claim 17, wherein the encoded signal comprises the combined value in the parameter data, and wherein the audio renderer is configured to determine the contribution of the one or more transport channels using the combined value for one of the relevant audio objects and the direction information for the one relevant audio object, and wherein the audio renderer is configured to determine the contribution for the one or more transport channels using a value derived from the combined value for another of the relevant audio objects in the one or more frequency bins and the direction information of the other relevant audio object.

19. The decoder of claim 15, wherein the audio renderer is configured to calculate a direct response information from the relevant audio objects per each frequency bin of the plurality of frequency bins and the direction information associated with the relevant audio objects in the frequency bins.

20. The decoder of claim 19, wherein the audio renderer is configured to determine a diffuse signal per each frequency bin of the plurality of frequency bins using a diffuseness information included in the metadata or a decorrelation rule and to combine a direct response as determined by the direct response information and the diffuse signal to acquire a spectral domain rendered signal for a channel of the number of channels, or to calculate a synthesis information using the direct response information and an information on the number of audio channels, and to apply the covariance synthesis information to the one or more transport channels to acquire the number of audio channels, or wherein the direct response information is a direct response vector for each relevant audio object, and wherein the covariance synthesis information is a covariance synthesis matrix, and wherein the audio renderer is configured to perform a matrix operation per frequency bin in applying the covariance synthesis information.

21. The decoder of claim 19, wherein the audio renderer is configured to derive, in the calculation of the direct response information, a direct response vector for each relevant audio object and to calculate, for each relevant audio object, a covariance matrix from each direct response vector, to derive, in the calculation of the covariance synthesis information, a target covariance information from the covariance matrices from each one of the relevant audio objects, a power information on the respective relevant audio object, and a power information derived from the one or more transport channels.

22. The decoder of claim 21, wherein the audio renderer is configured to derive, in the calculation of the direct response information, a direct response vector for each relevant audio object and to calculate, for each relevant audio object, a covariance matrix from each direct response vector, to derive an input covariance information from the transport channels, and to derive a mixing information from the target covariance information, the input covariance information and the information on the number of channels, and to apply the mixing information to the transport channels for each frequency bin in the time frame.

23. The decoder of claim 22, wherein a result of the application of the mixing information for each frequency bin in the time frame is converted into a time domain to acquire the number of audio channels in the time domain.

24. The decoder of claim 19, wherein the audio renderer is configured to only use main diagonal elements of an input covariance matrix derived from the transport channels in a decomposition of the input covariance matrix, or to perform a decomposition of a target covariance matrix using a direct response matrix and a matrix of powers of the objects or transport channels, or to perform a decomposition of the input covariance matrix by taking the root of each main diagonal element of the input covariance matrix, or to calculate a regularized inverse of a decomposed input covariance matrix, or to perform a singular value decomposition in calculating an optimum matrix to be used in an energy compensation without an extended identity matrix.

25. A method of encoding a plurality of audio objects, comprising:

calculating, for one or more frequency bins of a plurality of frequency bins related to a time frame, parameter data for at least two relevant audio objects, wherein a number of the at least two relevant audio objects is lower than a total number of the plurality of audio objects, wherein the calculating comprises performing a selection of the number of the at least two relevant audio objects and not indicating the total number of audio objects as being relevant, and outputting an encoded audio signal comprising information on the parameter data for the at least two relevant audio objects, wherein the calculating comprises converting each audio object of the plurality of audio objects into a spectral representation comprising the plurality of frequency bins, calculating a selection information from each audio object for the one or more frequency bins, wherein the selection information is an amplitude-related measure for the audio object, calculating a combined value from two relevant audio objects of the at least two relevant audio objects, and deriving object identifications as the parameter data indicating the at least two relevant audio objects, based on the selection information, and wherein the outputting comprises outputting, in the encoded audio signal, information on the object identifications as the parameter data for the at least two relevant audio objects, and one or more information items on the combined value or on more combined values, wherein a number of information items on the combined value or on the more combined values is equal to at least one and is lower than the number of relevant audio objects for the one or more frequency bins, or wherein the calculating comprises converting each audio object of the plurality of audio objects into a spectral representation comprising the plurality of frequency bins, calculating a selection information from each audio object for the one or more frequency bins, and selecting object identifications as the parameter data indicating the at least two relevant audio objects, based on an order of the selection information of the plurality of audio objects in the one or more frequency bins, and wherein the outputting comprises outputting, in the encoded audio signal, information on the object identifications for the at least two relevant audio objects as the parameter data, or wherein the outputting comprises outputting, in the encoded audio signal, one or more encoded transport channels, as the parameter data, two or more encoded object identifications for the relevant audio objects for the one or more frequency bins of the plurality of frequency bins in the time frame, and one or more encoded combined values or encoded amplitude related measures, and quantized and encoded direction data for each audio object in the time frame, the direction data being constant for all frequency bins of the one or more frequency bins, or wherein the calculating comprises calculating the parameter data for at least a most dominant object and a second most dominant object in the one or more frequency bins, wherein the most dominant object and the second most dominant object represent the relevant objects, or wherein a number of audio objects of the plurality of audio objects is three or more, the plurality of audio objects comprising a first audio object, a second audio object and a third audio object, and wherein the calculating comprises calculating for a first one of the one or more frequency bins, as the relevant audio objects, only a first group of audio objects, and calculating, as the relevant audio objects for a second frequency bin of the one or more frequency bins, only a second group of audio objects, wherein the first group of audio objects is different from the second group of audio objects at least with respect to one group member, or wherein the calculating comprises calculating raw parametric data with a first time or frequency resolution and combining the raw parametric data into combined parametric data comprising a second time or frequency resolution being lower than the first time of frequency resolution, and calculating the parameter data for the at least two relevant audio objects with respect to the combined parametric data comprising the second time or frequency resolution, or determining parameter bands comprising a second time or frequency resolution being different from a first time or frequency resolution used in a time or frequency decomposition of the plurality of audio objects, and calculating the parameter data for the at least two relevant audio objects for the parameter bands comprising the second time or frequency resolution, or wherein the plurality of audio objects comprise related metadata indicating direction information on the plurality of audio objects, and wherein the method further comprises: downmixing the plurality of audio objects to acquire one or more transport channels in response to the direction information on the plurality of audio objects; and encoding one or more transport channels to acquire one or more encoded transport channels; and wherein the outputting comprises outputting, in the encoded audio signal, the one or more transport channels.

26. A method of decoding an encoded audio signal comprising one or more transport channels and direction information for a plurality of audio objects, the direction information comprising a first direction information and a second direction information, and, for one or more frequency bins of a time frame, parameter data for at least two relevant audio objects, wherein a number of the at least two relevant audio objects is lower than a total number of the plurality of audio objects, wherein the number of the at least two relevant audio objects is a selection from the total number of audio objects, wherein the total number of audio objects is not indicated as being relevant, the method of decoding comprising:

providing the one or more transport channels in a spectral representation comprising, in the time frame, the plurality of frequency bins; and audio rendering the one or more transport channels into a number of audio channels using the direction information, wherein the audio rendering comprises calculating, for each one of the one or more frequency bins, a contribution from the one or more transport channels in accordance with the first direction information associated with a first one of the at least two relevant audio objects and in accordance with the second direction information associated with a second one of the at least two relevant audio objects, or wherein the audio rendering is performed so that a contribution from the one or more transport channels in accordance with the first direction information associated with a first one of the at least two relevant audio objects and in accordance with the second direction information associated with a second one of the at least two relevant audio objects is accounted for.

27. A non-transitory digital storage medium having stored thereon a computer program for performing, when said computer program is run by a computer, a method of encoding a plurality of audio objects, the method of encoding comprising:

calculating, for one or more frequency bins of a plurality of frequency bins related to a time frame, parameter data for at least two relevant audio objects, wherein a number of the at least two relevant audio objects is lower than a total number of the plurality of audio objects, wherein the calculating comprises performing a selection of the number of the at least two relevant audio objects and not indicating the total number of audio objects as being relevant, and outputting an encoded audio signal comprising information on the parameter data for the at least two relevant audio objects, wherein the calculating comprises converting each audio object of the plurality of audio objects into a spectral representation comprising the plurality of frequency bins, calculating a selection information from each audio object for the one or more frequency bins, wherein the selection information is an amplitude-related measure for the audio object, calculating a combined value from two relevant audio objects of the at least two relevant audio objects, and deriving object identifications as the parameter data indicating the at least two relevant audio objects, based on the selection information, and wherein the outputting comprises outputting, in the encoded audio signal, information on the object identifications as the parameter data for the at least two relevant audio objects, and one or more information items on the combined value or on more combined values, wherein a number of information items on the combined value or on the more combined values is equal to at least one and is lower than the number of relevant audio objects for the one or more frequency bins, or wherein the calculating comprises converting each audio object of the plurality of audio objects into a spectral representation comprising the plurality of frequency bins, calculating a selection information from each audio object for the one or more frequency bins, and selecting object identifications as the parameter data indicating the at least two relevant audio objects, based on an order of the selection information of the plurality of audio objects in the one or more frequency bins, and wherein the outputting comprises outputting, in the encoded audio signal, information on the object identifications for the at least two relevant audio objects as the parameter data, or wherein the outputting comprises outputting, in the encoded audio signal, one or more encoded transport channels, as the parameter data, two or more encoded object identifications for the relevant audio objects for the one or more frequency bins of the plurality of frequency bins in the time frame, and one or more encoded combined values or encoded amplitude related measures, and quantized and encoded direction data for each audio object in the time frame, the direction data being constant for all frequency bins of the one or more frequency bins, or wherein the calculating comprises calculating the parameter data for at least a most dominant object and a second most dominant object in the one or more frequency bins, wherein the most dominant object and the second most dominant object represent the relevant objects, or wherein a number of audio objects of the plurality of audio objects is three or more, the plurality of audio objects comprising a first audio object, a second audio object and a third audio object, and wherein the calculating comprises calculating for a first one of the one or more frequency bins, as the relevant audio objects, only a first group of audio objects, and calculating, as the relevant audio objects for a second frequency bin of the one or more frequency bins, only a second group of audio objects, wherein the first group of audio objects is different from the second group of audio objects at least with respect to one group member, or wherein the calculating comprises calculating raw parametric data with a first time or frequency resolution and combining the raw parametric data into combined parametric data comprising a second time or frequency resolution being lower than the first time of frequency resolution, and calculating the parameter data for the at least two relevant audio objects with respect to the combined parametric data comprising the second time or frequency resolution, or determining parameter bands comprising a second time or frequency resolution being different from a first time or frequency resolution used in a time or frequency decomposition of the plurality of audio objects, and calculating the parameter data for the at least two relevant audio objects for the parameter bands comprising the second time or frequency resolution, or wherein the plurality of audio objects comprise related metadata indicating direction information on the plurality of audio objects, and wherein the method further comprises: downmixing the plurality of audio objects to acquire one or more transport channels in response to the direction information on the plurality of audio objects; and encoding one or more transport channels to acquire one or more encoded transport channels; and wherein the outputting comprises outputting, in the encoded audio signal, the one or more transport channels.

28. A non-transitory digital storage medium having stored thereon a computer program for performing a method of decoding an encoded audio signal comprising one or more transport channels and direction information for a plurality of audio objects, the direction information comprising a first direction information and a second direction information, and, for one or more frequency bins of a time frame, parameter data for at least two relevant audio objects, wherein a number of the at least two relevant audio objects is lower than a total number of the plurality of audio objects, wherein the number of the at least two relevant audio objects is a selection from the total number of audio objects, wherein the total number of audio objects is not indicated as being relevant, the method of decoding comprising:

providing the one or more transport channels in a spectral representation comprising, in the time frame, the plurality of frequency bins; and audio rendering the one or more transport channels into a number of audio channels using the direction information, wherein the audio rendering comprises calculating, for each one of the one or more frequency bins, a contribution from the one or more transport channels in accordance with the first direction information associated with a first one of the at least two relevant audio objects and in accordance with the second direction information associated with a second one of the at least two relevant audio objects, or wherein the audio rendering is performed so that a contribution from the one or more transport channels in accordance with the first direction information associated with a first one of the at least two relevant audio objects and in accordance with the second direction information associated with a second one of the at least two relevant audio objects is accounted for, when said computer program is run by a computer.

* * * * *